United States Patent
Kim et al.

(10) Patent No.: US 9,769,758 B2
(45) Date of Patent: Sep. 19, 2017

(54) CHANNEL ACCESS METHOD IN WIRELESS COMMUNICATION SYSTEM AND APPARATUS THEREFOR

(71) Applicant: LG ELECTRONICS INC., Seoul (KR)

(72) Inventors: Jeongki Kim, Anyang-si (KR); Yongho Seok, Anyang-si (KR); Jinsam Kwak, Anyang-si (KR); Jinsoo Choi, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 43 days.

(21) Appl. No.: 14/378,745

(22) PCT Filed: Feb. 15, 2013

(86) PCT No.: PCT/KR2013/001208
§ 371 (c)(1),
(2) Date: Aug. 14, 2014

(87) PCT Pub. No.: WO2013/122424
PCT Pub. Date: Aug. 22, 2013

(65) Prior Publication Data
US 2015/0009879 A1    Jan. 8, 2015

Related U.S. Application Data

(60) Provisional application No. 61/598,908, filed on Feb. 15, 2012.

(51) Int. Cl.
*H04W 52/02* (2009.01)
*H04W 74/06* (2009.01)
(Continued)

(52) U.S. Cl.
CPC ....... *H04W 52/0235* (2013.01); *H04L 1/1614* (2013.01); *H04L 1/1685* (2013.01);
(Continued)

(58) Field of Classification Search
CPC . H04W 74/06; H04W 74/002; H04W 52/023; H04W 52/0216; H04W 84/125; H04W 84/122
See application file for complete search history.

(56) References Cited

U.S. PATENT DOCUMENTS

2009/0016306 A1    1/2009  Wang et al.
2010/0189024 A1    7/2010  Xhafa et al.
(Continued)

FOREIGN PATENT DOCUMENTS

CN        1638309 A     7/2005
CN      101557330 A    10/2009
(Continued)

*Primary Examiner* — Feben M Haile
(74) *Attorney, Agent, or Firm* — Dentons US LLP

(57) ABSTRACT

A channel access method in a wireless communication system and an apparatus for supporting the same are disclosed. Particularly, the method comprises the steps of: transmitting a beacon frame containing a traffic indication map (TIM); and receiving a power pave (PS)-poll frame within a PS-Poll section set in a station (STA), to which downlink data is designated by the TIM, from the STA, wherein the PS-Poll section can be set differently for each STA within the entire PS-Poll section set in all STAs, to which downlink data is designated by the TIM.

26 Claims, 42 Drawing Sheets

(51) Int. Cl.
     *H04L 1/16*          (2006.01)
     *H04W 74/00*      (2009.01)
     *H04W 84/12*      (2009.01)

(52) U.S. Cl.
     CPC ..... *H04W 52/0216* (2013.01); *H04W 74/002* (2013.01); *H04W 74/06* (2013.01); *H04W 84/12* (2013.01); *Y02B 60/50* (2013.01)

(56) References Cited

U.S. PATENT DOCUMENTS

| | | | |
|---|---|---|---|
| 2010/0214942 A1* | 8/2010 | Du | H04L 43/0876 370/252 |
| 2013/0128798 A1* | 5/2013 | Liu | H04W 48/12 370/312 |
| 2013/0195036 A1* | 8/2013 | Quan | H04W 72/04 370/329 |

FOREIGN PATENT DOCUMENTS

| | | | |
|---|---|---|---|
| CN | 101582875 | A | 11/2009 |
| EP | 1548987 | A2 | 12/2004 |
| JP | 2005197798 | A | 7/2005 |
| JP | 2007158529 | A | 6/2007 |
| JP | 2009540632 | A | 11/2009 |
| JP | 2011234408 | A | 11/2011 |
| JP | 2015502111 | A | 1/2015 |
| KR | 10-2011-0069345 | A | 6/2011 |
| WO | 2011-030956 | A1 | 3/2011 |
| WO | 2011-149285 | A2 | 12/2011 |
| WO | 2013078303 | A1 | 5/2013 |

\* cited by examiner

FIG. 13
(a) 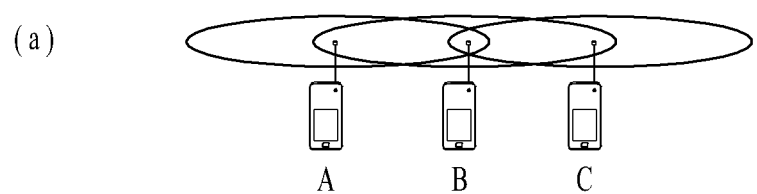
(b) 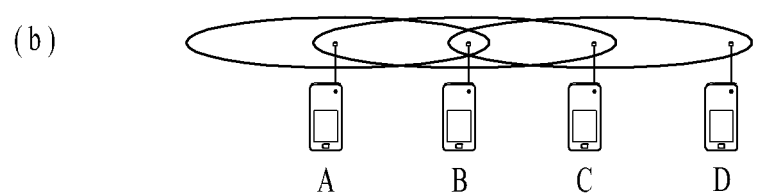

FIG. 14
(a) 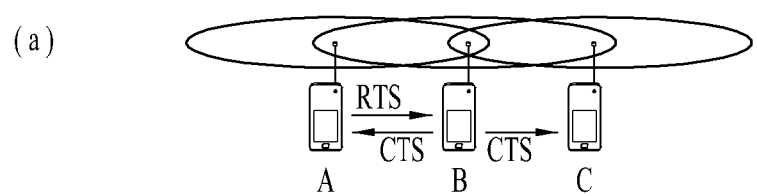
(b) 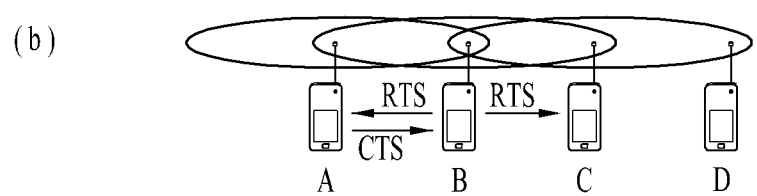

D1 = aRxRFDelay + aRxPLCPDelay (referenced from the end of the last symbol of a frame on the medium)
D2 = D1 + Air Propagation Time
Rx/Tx = aRXTXTurnaroundTime (begins with a PHYTXSTART.request)
M1 = M2 = aMACProcessingDelay
CCAdel = aCCA Time - D1

FIG. 20

| Element ID | Length | DTIM Count | DTIM Period | Bitmap Control | Partial Virtual Bitmap |
|---|---|---|---|---|---|
| 1 | 1 | 1 | 1 | 1 | 1-251 |

Octets:

FIG. 21

| Element ID | Length | TSF 0 Offset | Interval/ Duration | Optional Subelements |
|---|---|---|---|---|
| 1 | 1 | 8 | 4 | variable |

Octets:

FIG. 22
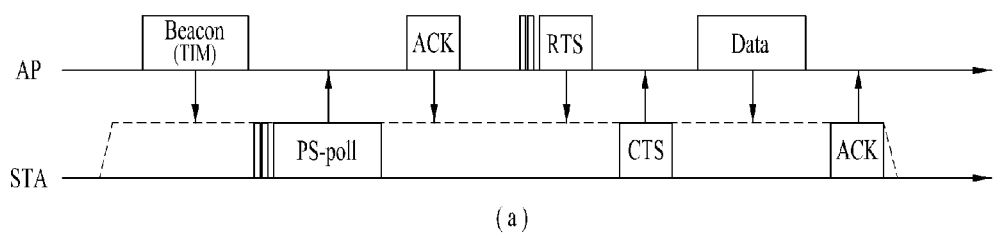
(a)
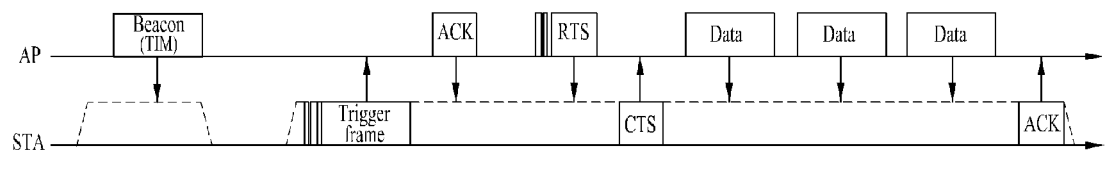
(b)

| Frame control | AID = broadcast | BSSID | Bitmap size | ACK bitmap | Padding (For byte alignment) |
|---|---|---|---|---|---|

Otects:　2　　2　　6　　2　　Variable　Variable (< 8 bits)

(b)

| Frame control | AID = broadcast | BSSID | ACK bitmap | Padding (For byte alignment) |
|---|---|---|---|---|

Otects:　2　　2　　6　　Variable　Variable (< 8 bits)

(c)

| Frame control | BSSID | ACK bitmap | Padding (For byte alignment) |
|---|---|---|---|

Otects:　2　　6　　Variable　Variable (< 8 bits)

CHANNEL ACCESS METHOD IN WIRELESS COMMUNICATION SYSTEM AND APPARATUS THEREFOR

This application is a National Stage Entry of International Application No. PCT/KR2013/001208 filed Feb. 15, 2013, which claims priority to U.S. Provisional Application No. 61/598,908 filed Feb. 15, 2012, both of which are incorporated herein by reference.

TECHNICAL FIELD

The present invention relates to a wireless communication system and, more particularly, to a channel access method in a wireless LAN system and an apparatus supporting the same.

BACKGROUND ART

With recent development of information communication technology, a variety of wireless communication technologies have been developed. From among them, WLAN is a technology that allows wireless access to the Internet at home, in businesses, or in specific service providing areas using mobile terminals, such as a personal digital assistant (PDA), a laptop computer, and a portable multimedia player (PMP), based on the radio frequency technology.

In order to overcome the limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed greater than or equal to 540 Mbps. In addition, Multiple Input and Multiple Output (MIMO) technology, which employs multiple antennas for both a transmitter and a receiver in order to minimize transmission errors and to optimize a data rate.

DISCLOSURE

Technical Problem

An object of the present invention devised to solve the problem lies in an improved channel access method in a wireless communication system, preferably, in a WLAN system and an apparatus therefor.

Another object of the present invention is to provide a method to prevent unnecessary power consumption and delayed transmission by a terminal resulting from operation of competition-based channel access and an apparatus therefor.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a channel access method for supporting channel access of a station (STA) in a wireless communication system, including the steps of transmitting a beacon frame containing a traffic indication map (TIM), and receiving a Power Save (PS)-Poll frame from an STA assigned with downlink data by the TIM within a PS-Poll interval set for the STA, wherein the PS-Poll interval is set differently for each of STA, within a total PS-Poll interval set for every STA assigned with downlink data by the TIM.

In another aspect of the present invention, provided herein is an apparatus for supporting channel access of a station (STA) in a wireless communication system, including a tranceiver configured to transmit and receive a radio frequency signal, and a processor, wherein the processor is configured to transmit a beacon frame containing a traffic indication map (TIM) and to receive a Power Save (PS)-Poll frame from an STA assigned with downlink data by the TIM within a PS-Poll interval set for the STA, wherein the PS-Poll interval is set differently for each of STA, within a total PS-Poll interval set for every STA assigned with downlink data by the TIM.

Preferably, an acknowledgement (ACK) frame may be transmitted to the STA within the PS-Poll interval assigned to the STA, in response to the PS-Poll frame.

Preferably, when the STA is assigned with a last PS-Poll interval within the total PS-Poll interval, a data frame may be transmitted to the STA, in response to the PS-Poll frame.

Preferably, a short training field (STF) may be transmitted to the STA within the PS-Poll interval assigned to the STA, in response to the PS-Poll frame, and an acknowledgement (ACK) frame containing a bitmap indicating whether or not the PS-Poll frames from the every STA have been received may be transmitted after the total PS-Poll interval.

Preferably, when the STA is assigned with a last PS-Poll interval within the total PS-Poll interval, an ACK frame may be transmitted to the STA, in response to the PS-Poll frame.

Preferably, when the PS-Poll frame is not received from the STA within the PS-Poll interval set for the STA, an unsolicited ACK frame or a short training field (STF) may be transmitted to the STA within the PS-Poll interval set for the STA.

Preferably, when a delay sensitive data frame is to transmitted to the STA, the delay sensitive data frame may be transmitted to the STA without a random backoff procedure, after the total PS-Poll interval.

In another aspect of the present invention, provided herein is a channel access method for a station (STA) to perform channel access in a wireless communication system, including the steps of receiving a beacon frame containing a traffic indication map (TIM) from an access point (AP), and transmitting, when downlink data is assigned by the TIM, a Power Save (PS)-Poll frame within a PS-Poll interval set for the STA, wherein the PS-Poll interval is set differently for each of STA assigned with downlink data by the TIM within an established total PS-Poll interval.

In another aspect of the present invention, provided herein is a station (STA) apparatus configured to perform channel access in a wireless communication system, including a tranceiver configured to transmit and receive a radio frequency signal, and a processor, wherein the processor is configured to receive a beacon frame containing a traffic indication map (TIM) from an access point (AP) and to transmit, when downlink data is assigned by the TIM, a Power Save (PS)-Poll frame within a PS-Poll interval set for the STA, wherein the PS-Poll interval is set differently for each of STA assigned with downlink data by the TIM within an established total PS-Poll interval.

Preferably, a sleep state may be maintained in an interval within the total PS-Poll interval other than the PS-Poll interval set for the STA.

Preferably, an acknowledgement (ACK) frame may be received within the PS-Poll interval set for the STA, in response to the PS-Poll frame.

Preferably, when the STA is assigned with a last PS-Poll interval within the total PS-Poll interval, a data frame from the AP may be received in response to the PS-Poll frame.

Preferably, a short training field (STF) may be received within the PS-Poll interval set for the STA, in response to the PS-Poll frame, and after the total PS-Poll interval, an acknowledgement (ACK) frame containing a bitmap indicating whether or not the PS-Poll frames from the every STA have been received may be received.

Preferably, when the STA is assigned with a last PS-Poll interval within the total PS-Poll interval, an acknowledgement (ACK) frame may be received from the AP, in response to the PS-Poll frame.

Advantageous Effects

According to one embodiment, an improved channel access method and an apparatus therefor are provided in a wireless communication system, preferably, a WLAN system.

According to one embodiment, by specifying the channel access intervals for the respective stations, unnecessary power consumption and delayed transmission due to contention-based channel access may be prevented.

The effects that can be obtained from the present invention are not limited to the aforementioned effects, and other effects may be clearly understood by those skilled in the art from the descriptions given below.

DESCRIPTION OF DRAWINGS

The accompanying drawings, which are included to provide a further understanding of the invention, illustrate embodiments of the invention and together with the description serve to explain the principle of the invention.

FIG. 13 illustrates a hidden node and an exposed node.

FIG. 14 illustrates RTS and CTS.

FIG. 20 illustrates an exemplary format of a TIM element.

FIG. 21 illustrates an exemplary format of a U-APSD coexistence element.

FIG. 22 illustrates operation of an SAT according to a PS-Poll mechanism and a U-APSD mechanism.

FIG. 36 exemplarily illustrates a PS-Poll group ACK frame according to one embodiment of the present invention.

BEST MODE

Figure 1:
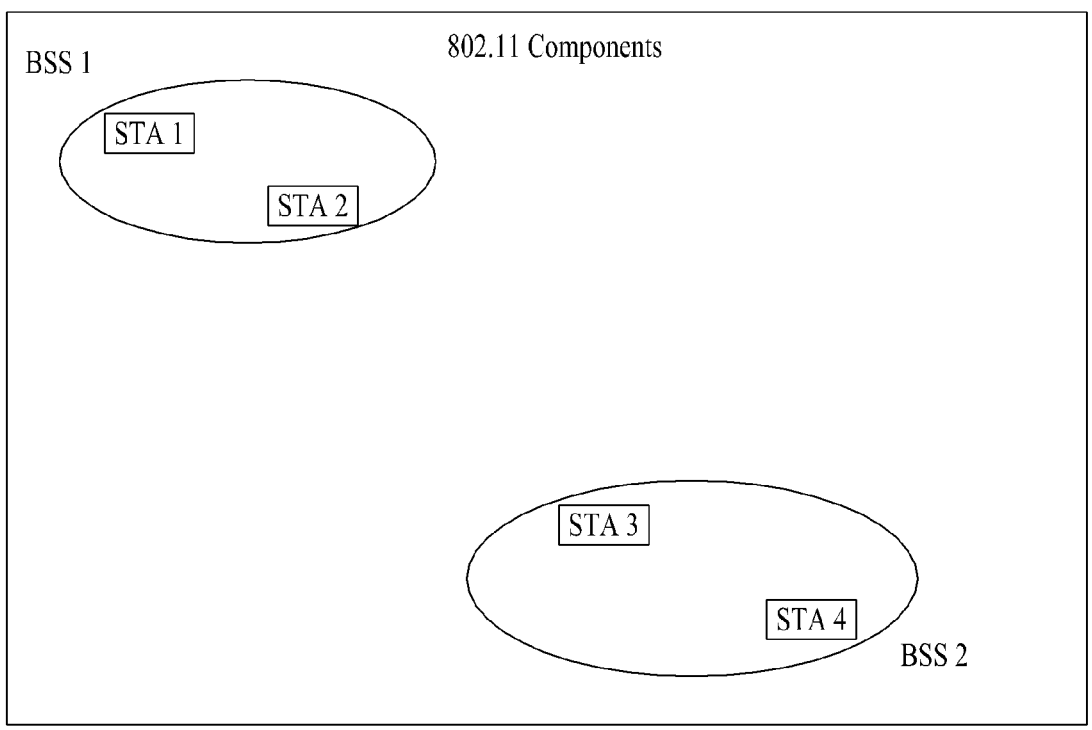
FIG. 1 is a diagram showing an exemplary structure of an IEEE 802.11 system to which the present invention is applicable.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show only the embodiments that can be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices may be mainly illustrated in the form of block diagrams.

Specific terms are employed in the following descriptions for better understanding of the present invention. Such specific terms may take other forms within the technical scope or spirit of the present invention.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802-20, and E-UTRA (Evolved UTRA). UTRA is a part of a UMTS (Universal Mobile Telecommunications System). 3GPP (3rd Generation Partnership Project) LTE (long term evolution), which is a part of E-UMTS (Evolved UMTS) that uses E-UTRA, employs OFDMA in downlink and SC-FDMA in uplink. LTE-A (LTE-Advanced) is an evolved version of 3GPP LTE.

For clarity, the following description mainly focuses on IEEE 802.11 systems, but technical features of the present invention are not limited thereto.

Generals of the System

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by interaction between the components. A Basic Service Set (BSS) may correspond to a basic component block in an IEEE 802.11 LAN. In FIG. 1, two BSSs (BSS1 and BSS2) are shown and each of the BSSs includes two STAs as members thereof (i.e., STA1 and STA2 are included in BSS1, and STA3 and STA4 are included in BSS2). In FIG. 1, an ellipse indicating each BSS may be understood as a coverage area in which STAs included in the BSS maintain communication. This area may be referred to as a basic service area (BSA). If an STA moves out of the BSA, the STA cannot directly communicate with the other STAs within the BSA.

In the IEEE 802.11 LAN, the most basic type of BSS is an independent BSS (IBSS). For example, the IBSS may have a minimal form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. This type of LAN may be configured when the LAN is necessary, rather than being prescheduled. This may be referred to as an ad-hoc network.

Memberships of an STA in a BSS may be dynamically changed according to whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically set and may include use of a distribution system service (DSS).

Figure 2:
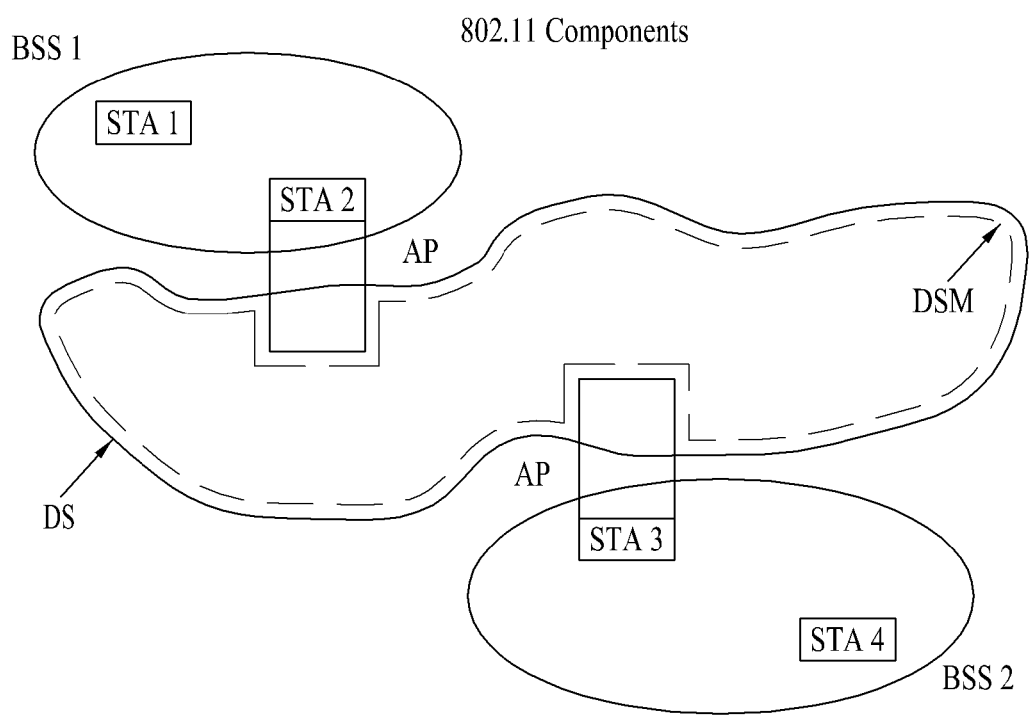
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical layer (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network configured with a plurality of BSSs, rather than being independently present as shown in FIG. 1.

The DS is a logical concept and may be specified by the characteristics of the DSM. In this regard, a wireless medium (WM) and the DSM are logically distinguished from each other in IEEE 802.11. Respective logical media are used for different purposes and are used by different components. In definition of IEEE 802.11, such media are not restricted to either the same or different media. The flexibility of the IEEE 802.11 LAN architecture (DS architecture or other network architectures) can be explained in that plural media are logically different from each other. That is, the IEEE 802.11 LAN architecture can be implemented in variously manners and may be independently specified by a physical property of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs basically correspond to STAs, all APs are addressable entities. An address used by an AP for communication on the WM does not need to be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
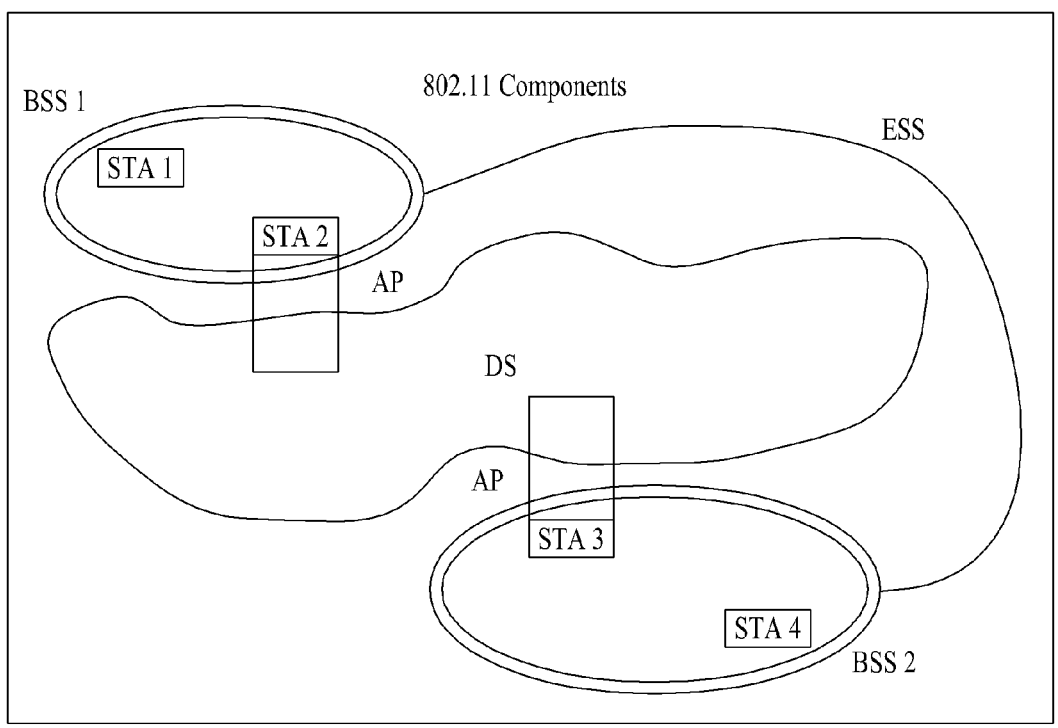
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be constructed with a DS and BSSs. In the IEEE 802.11 system, this type of network is referred to as an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, any relative physical locations of the BSSs in FIG. 3 are not assumed and the following forms are all possible. BSSs may partially overlap and this form is generally used to provide continuous coverage. The BSSs may not be physically connected, and the distances between BSSs logically have no limit. The BSSs may be located at the same physical position and this form may be used to provide redundancy. One or more IBSSs or ESS networks may be physically present in the same space as one or more ESS networks. This may correspond to an ESS network form in the case that an ad-hoc network operates in a location in which an ESS network is present, in the case in which IEEE 802.11 networks of different organizations physically overlap, or in the case that two or more different access and security policies are necessary in the same location.

Figure 4:
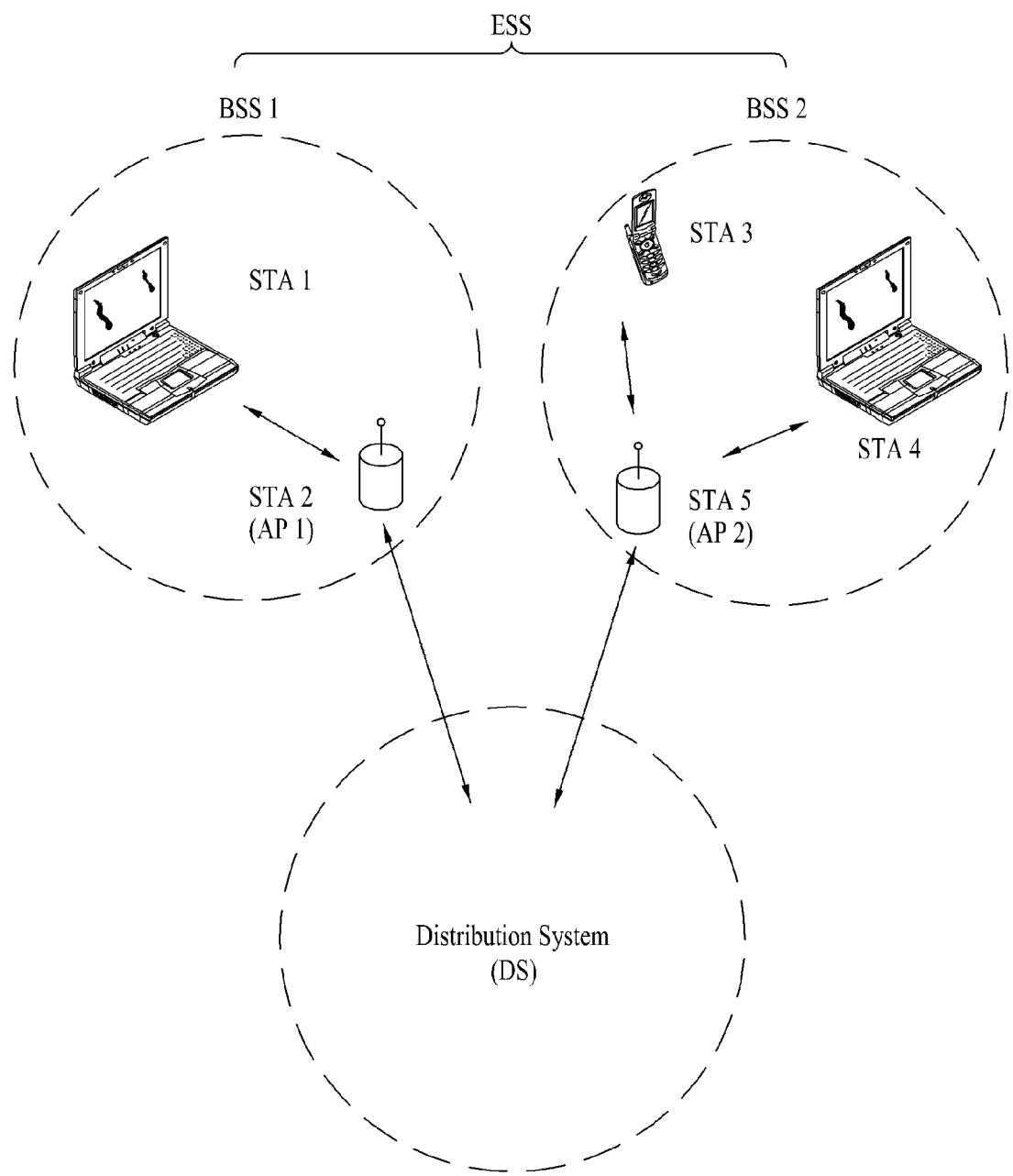
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices such as laptop computers or mobile phones which are generally handled directly by users. In the example of FIG. 4, STA1, STA3, and STA4 correspond to the non-AP STAs and STA2 and STA5 correspond to AP STAs.

In the following description, the non-AP STA may be called a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (e-NB), a base transceiver system (BTS), or a femto BS in other wireless communication fields.

Figure 5:
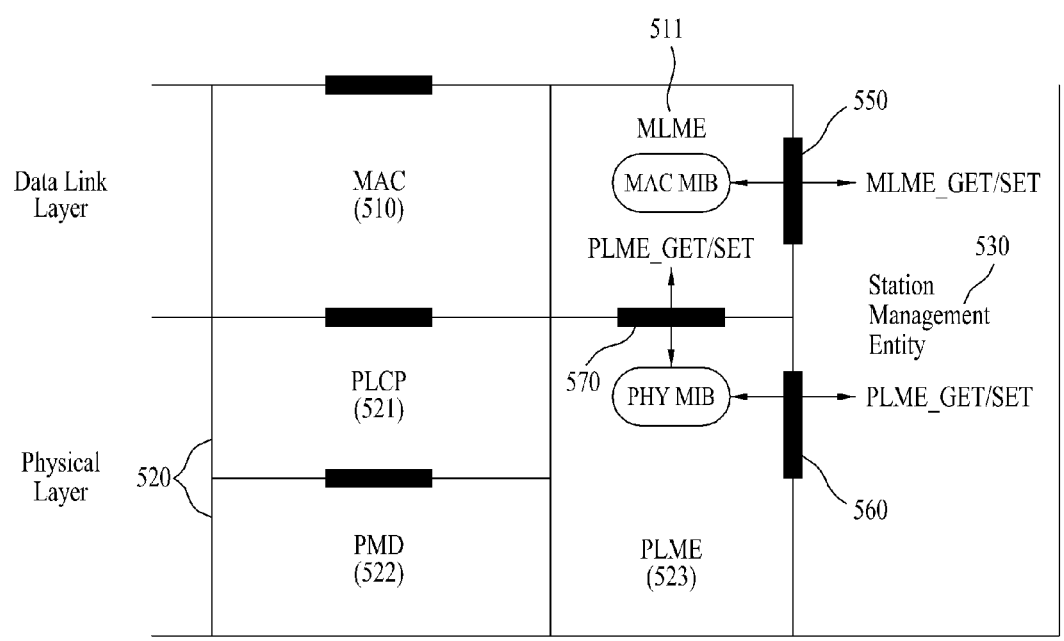
FIG. 5 shows exemplary structures of a data link layer and a physical layer of an IEEE 802.11 system to which the present invention is applicable.

FIG. 5 shows exemplary structures of a data link layer and a physical layer of an IEEE 802.11 system to which the present invention is applicable.

Referring to FIG. 5, the physical layer 520 may include a PLCP (physical layer convergence procedure) entity 521) and a PMD (physical medium dependent) entity 522. The PLCP entity serves to connect a MAC sublayer 510 to a data frame. The PMD entity 522 serves to wirelessly transmit and receive data with two or more STAs using the OFDM scheme.

Both the MAC sublayer 510 and physical layer 520 conceptually include management entities, which may be called a MAC sublayer management entity (MLME) 511 and a physical layer management entity (PLME) 521, respectively. These entities 511 and 521 provide layer management service interfaces through layer management functions.

In order to provide correct MAC operation, a station management entity (SME) 530 is present within each STA. The SME 530 is a layer-independent management entity that gathers information about layer-dependent status from the various layer management entities or sets values of layer-specific parameters. The SME 530 may perform such functions on behalf of general system management entities and implement standard management protocols.

The various entities as above interact in various ways. FIG. 5 illustrates some examples of exchanging GET/SET primitives. XX-GET.request primitive is used to request the value of a management information base (MIB) attribute. XX-GET.confirm primitive returns the value of a corresponding MIB attribute if the status is "SUCCESS," otherwise returning an error indication in the status field. XX- SET.request primitive is used hat a designated MIB attribute be set to a given value. If this MIB attribute implies a specific action, this request that a specific operation be performed. And, in case that a status corresponds to "SUCCESS," XX-SET.confirm primitive indicates that the designated MIB attribute has been set to the requested value. Otherwise, the status field indicates an error condition. If this MIB attribute implies a specific operation, this primitive may confirm that the operation is performed.

As shown in FIG. 5, the MLME 511 and the SME 530, and the PLME 523 and the SME 530 may exchange various primitives via an MLME_service access point (MLME_SAP) 550 and a PLME_service access point (PLME_SAP) 560, respectively. In addition, the MLME 511 and the PLME 523 may exchange a primitive via an MLME-PLME_service access point (MLME-PLME_SAP) 570.

Link Setup Process

Figure 6:
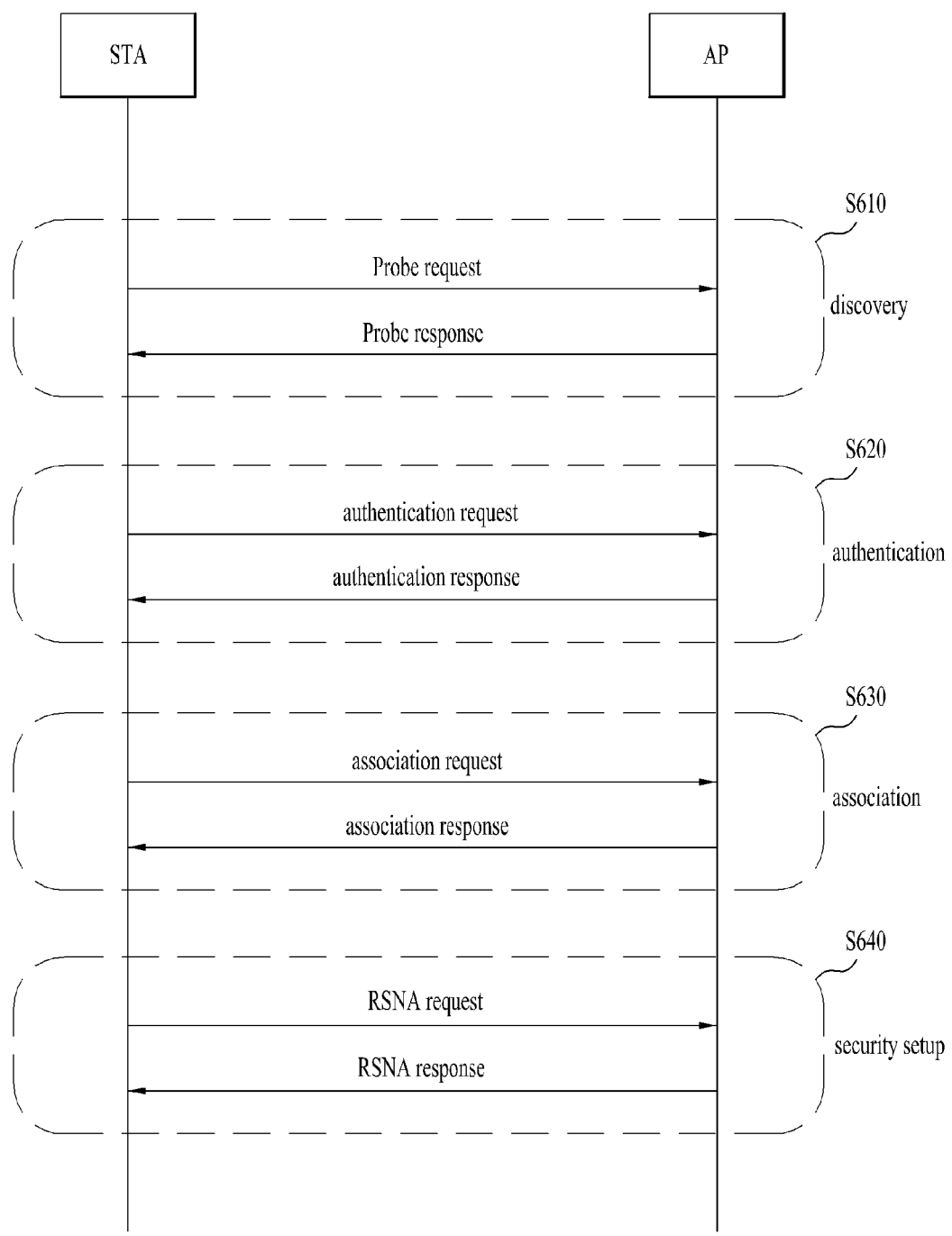
FIG. 6 illustrates a general link setup process in a WLAN system to which the present invention is applicable.

FIG. 6 illustrates a general link setup process in a WLAN system to which the present invention is applicable.

To establish link setup on the network and transmit/receive data over the network, the STA should perform the processes of network discovery, authentication, and establishment of association and perform security authentication. The link setup process may also be referred to as a session initiation process or a session setup process. In addition, the discovery, authentication, association, and security setup steps of the link setup process may be called an association step in a general sense.

An exemplar link setup process is described with reference to FIG. 6.

In step S610, the STA may perform the network discovery operation. The network discovery operation may include the scanning operation by the STA. That is, the STA needs to search for an available network so as to access the network. The STA needs to identify a compatible network before participating in a wireless network. Herein, the process of identifying the network contained in a specific region is referred to as scanning.

The scanning operation is classified into active scanning and passive scanning.

FIG. 6 exemplarily shows a network discovery operation including an active scanning process. In the case of the active scanning, the STA configured to perform scanning transmits a probe request frame and waits for a response to the probe request frame, in order to move between channels and search for APs present in a peripheral region. A responder transmits a probe response frame to the STA having transmitted the probe request frame, in response to the probe request frame. Herein, the responder may be an STA that has finally transmitted a beacon frame in a BSS of the scanned channel. In the BSS, since the AP transmits the beacon frame, the AP serves as the responder. In the IBSS, STAs within the IBSS transmit the beacon frame in rotation, and thus the responder is changeable. For example, the STA that has transmitted the probe request frame at Channel #1 and has received the probe response frame at Channel #1 may store BSS-associated information contained in the received probe response frame and move to the next channel (for example, Channel #2) to perform scanning (i.e., transmission/reception of a probe request/response at Channel #2) in the same manner.

Although not shown in FIG. 6, the scanning operation may also be carried out in the passive scanning manner. An STA configured to perform scanning in the passive scanning mode waits for a beacon frame while moving from one channel to another channel. The beacon frame, which is one of the management frames in IEEE 802.11, is periodically transmitted to indicate presence of a wireless network and allows the STA performing scanning to search for the wireless network and participate in the wireless network. In a BSS, the AP periodically transmits the beacon frame. In an IBSS, STAs of the IBSS transmit the beacon frame in rotation. If an STA performing scanning receives the beacon frame, the STA stores information about the BSS contained in the beacon frame, and moves to another channel and records beacon frame information at each channel. The STA having received the beacon frame stores BSS-related information contained in the received beacon frame, moves to the next channel, and then performs scanning in the same manner.

In comparison between the active scanning and the passive scanning, the active scanning is more advantageous than the passive scanning in terms of delay and power consumption.

After the STA discovers the network, the STA may perform authentication in step S620. This authentication process may be referred to as a first authentication such that this process may be clearly distinguished from the security setup process of step S640.

The authentication process may include transmitting, by the STA, an authentication request frame to an AP and transmitting, by the AP, an authentication response frame to the STA in response to the authentication request frame. The authentication frame used for authentication request/response may correspond to a management frame.

The authentication frame may include information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or may include additional information.

The STA may transmit the authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S630. The association process may include the steps of transmitting, by the STA, an association request frame to the AP and transmitting, by the AP, an association response frame to the STA in response.

For example, the association request frame may include information related to various capabilities, a beacon listen interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information capable of being contained in the association request/response frame, may be replaced with other information, or may include additional information.

After the STA is successfully associated with the network, the security setup process may be performed in step S640. The security setup process of step S640 may be referred to as an authentication process based on a robust security network association (RSNA) request/response. The authentication process of step S620 may be referred to as a first authentication process, and the security setup process of Step S640 may be simply referred to as an authentication process.

The security setup process of Step S640 may include, for example, a private key setup process through 4-way handshaking based on an extensible authentication protocol over LAN (EAPOL) frame. In addition, the security setup process may also be carried out according to other security schemes not defined in IEEE 802.11 standards.

Evolution of WLAN

In order to overcome a limit in WLAN communication speed, IEEE 802.11n has recently been established as a communication standard. IEEE 802.11n aims to increase network speed and reliability as well as to extend a coverage region of the wireless network. More specifically, IEEE 802.11n supports a high throughput (HT) of a maximum data processing speed greater than or equal to 540 Mbps, and is based on the Multiple inputs and Multiple outputs (MIMO) technology in which multiple antennas are used at both a transmitter and a receiver.

With widespread use of the WLAN technology and diversification of WLAN applications, there has been a need to develop a new WLAN system capable of supporting a HT higher than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed of 1 Gbps or more at an MAC service access point (MAC SAP).

In order to efficiently utilize a radio frequency channel, the next generation WLAN system supports Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA. In addition, a technology for supporting WLAN system operations in whitespace has recently been discussed. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band capable of being primarily used by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case that the licensed user such as a microphone is already using a specific WS channel which is in a frequency band divided on regulation to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user comes to use the frequency band.

Therefore, the AP and/or STA needs to pre-perform checking whether it is possible to use a specific frequency band within the WS band, namely whether a licensed user is in the frequency band. Checking whether a licensed user is in the specific frequency band is referred to as spectrum sensing. An energy detection scheme, a signature detection scheme and the like are utilized as the spectrum sensing mechanism. The AP and/or STA may determine that a licensed user is using the specific frequency band if the intensity of a received signal exceeds a predetermined value, or when a DTV preamble is detected.

A Machine to Machine (M2M) communication technology has been discussed as a next generation communication technology. Technical standard to support M2M communication in the IEEE 802.11 WLAN system is also under development as IEEE 802.11ah. M2M communication, which means a communication scheme involving one or more machines, may also be referred to as machine type communication (MTC) or Machine To Machine (M2M) communication. Herein, the machine may represent an entity that does not require direct manipulation or intervention by a user. For example, not only a meter or vending machine equipped with a wireless communication module, but also a user equipment such as a smartphone which is capable of performing communication by automatically accessing the network without manipulation/intervention by the user may be an example of machines. M2M communication may include device-to-device (D2D) communication and communication between a device and an application server. As an example of communication between the device and the application server, communication between a vending machine and an application server, communication between the Point of Sale (POS) device and the application server, and communication between an electric meter, a gas meter or a water meter and the application server. M2M communication-based applications may include security, transportation and healthcare. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications that support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, there have been discussions about methods to efficiently support the case in which a very small number of STAs have a data frame to receive from the AP during one beacon period while the number of STAs to be associated with one AP increases in the WLAN system.

As described above, the WLAN technology is rapidly evolving, and not only the aforementioned exemplary techniques but also other techniques for direct link setup, improvement of media streaming throughput, support of high-speed and/or large-scale initial session setup, and support of extended bandwidth and operation frequency are under development.

Frame Structure

Figure 7:
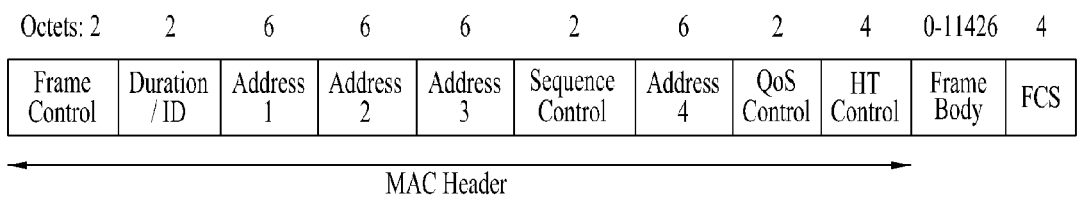
FIG. 7 exemplarily shows an MAC frame format of an IEEE 802.11 system to which the present invention is applicable.

FIG. 7 exemplarily shows an MAC frame format of an IEEE 802.11 system to which the present invention is applicable.

Referring to FIG. 7, a MAC frame format includes a MAC header (MHR), a MAC payload, and a MAC footer (MFR). The MHR includes a frame control field, a duration/ID field, an Address 1 field, an Address 2 field, an Address 3 field, a sequence control field, an Address 4 field, a quality of service (QoS) Control field, and an HT Control field. The Frame Body field, defined by the MAC payload, has data located to be transmitted in a higher layer, and has a variable size. The frame check sequence (FCS) field is defined by the MAC footer and is used to search for an error of the MAC frame.

The first three fields (the frame control field, the duration/ID field and the Address 1 field), and the last field (the FCS field) constitute a minimal frame format, and are present in all frames. The other fields may be present only in a specific type of frames.

Information contained in each of the aforementioned fields may comply with the definition of the IEEE 802.11 system. In addition, each of the aforementioned fields may be an example of fields which may be included in a MAC frame, and may be replaced with another field or include an additional field.

Figure 8:
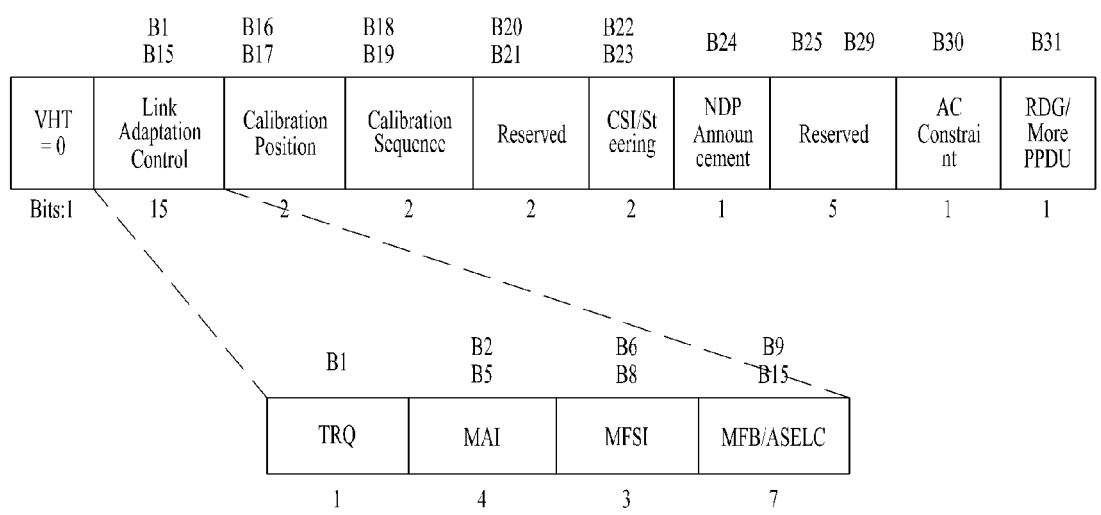
FIG. 8 exemplarily shows an HT format of the HT Control field in the MAC frame of FIG. 7.

FIG. 8 exemplarily shows an HT format of the HT Control field in the MAC frame of FIG. 7.

Referring to FIG. 8, The HT Control field may include a VHT subfield, a Link Adaptation subfield, a Calibration Position subfield, a Calibration Sequence field, a CSI (Channel State Information)/Steering subfield, an NDP (Null Data Packet) Announcement field, an AC (Access Category) Constraint subfield, and an RDG (Reverse Direction Grant)/More PPDU subfield, and a Reserved subfield.

The Link Adaptation subfield may include a TRQ (Training Request) subfield, an MAI (MCS (Modulation and Coding Scheme) Request or ASEL (Antenna Selection) Indication) subfield, an MFSI (MCS Feedback Sequence Identifier) subfield, an MFB/ASELC (MCS Feedback and Antenna Selection Command/data) subfield.

The TRQ subfield is set to 1 when a request for transmission of a sounding PPDU is made to a responder, and is set to 0 when a request for transmission of the sounding PPDU is made to the responder. When the MAI subfield is set to 14, it represents ASEL indication, and the MFB/ASELC subfield is interpreted as the antenna selection command/data. Otherwise, the MAI subfield represents an MCS request, and the MFB/ASELC subfield is interpreted as the MCS feedback. In the case that the MAI subfield represents the MCS request (MRQ), the subfield is set to 0 when no MCS feedback is requested and is set to 1 when an MCS feedback is requested. The sounding PPDU, which may be used for channel estimation, represent a PPDU for transmitting a training symbol.

Each of the aforementioned subfields, which are examples of subfields that can be included in the HT Control field, may be replaced with another subfield or may include an additional subfield.

Figure 9:
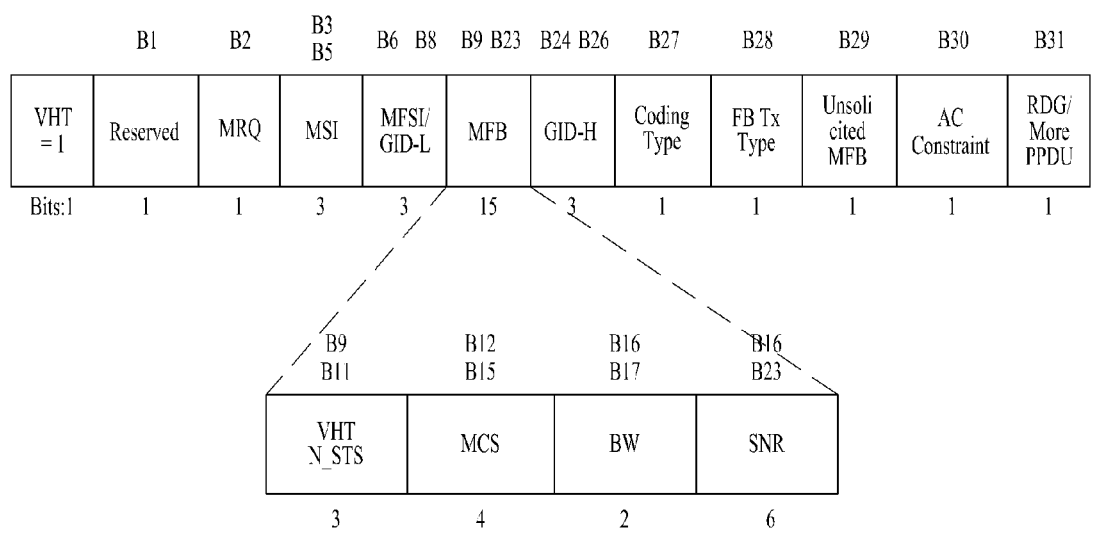
FIG. 9 exemplarily shows a VHT format of the HT Control field in the MAC frame of FIG. 7.

FIG. 9 exemplarily shows a VHT format of the HT Control field in the MAC frame of FIG. 7.

Referring to FIG. 9, the HT Control field may include a VHT subfield, an MRQ subfield, an MSI subfield, an MFSI/GID-L (MCS Feedback Sequence Indication/LSB of Group ID) subfield, an MFB subfield, a GID-H (MSB of Group ID) subfield, a Coding Type subfield, an FB Tx Type (Transmission type of MFB response) subfield, an Unsolicited MFB subfield, an AC Constraint subfield, and an RDG/More PPDU subfield. In addition, the MFB subfield may include a VHT N_STS (Number of Space Time Streams) subfield, MCS subfield, a BW (Bandwidth) subfield, and an SNR (Signal to Noise Ratio) subfield.

Table 1 provides descriptions of the subfields in the VHT format of the HT Control field.

TABLE 1

| Subfield | Meaning | Definition |
| --- | --- | --- |
| MRQ | MCS request | It is set to 1 when the MCS feedback(solicited MFB) is requested. Otherwise, it is set to 0. |
| MSI | MRQ sequence identifier | When the MRQ subfield is set to 1, the MSI subfield includes a sequence number for identifying a specific request between 0 and 6. If the MRQ subfield is set to 0, the MSI subfield is reserved. |
| MFSI/GID-L | MFB sequence identifier/LSB of Group ID | If the unsolicited MFB subfield is set to 0, the MFSI/GID-L subfield includes a received value of the MSI included in a frame indicated by the MFB information. If the unsolicited MFB subfield is set to 1, the MFSI/GID-L subfield includes three least significant bits of Group ID of the PPDU indicated by the unsolicited MFB. |
| MFB | VHT N_STS, MCS, BW, SNR feedback | The MFB subfield includes a recommended MFB. If MCS = 15 and VHT N_STS = 7, it indicates that feedback is not present. |
| GID-H | MSB of Group ID | If the unsolicited MFB subfield is set to 1, the GID-H subfield includes three most significant bits of Group ID of the PPDU indicated by the unsolicited MFB. |
| Coding Type | Coding type of MFB response | If the unsolicited MFB subfield is set to 1, the Coding Type subfield contains coding information (1 for a binary convolutional code (BCC) and 0 for a low-density parity check (LDPC)) indicated by the unsolicited MFB. Otherwise, it is reserved. |
| FB Tx Type | Transmission type of MFB response | If the unsolicited MFB subfield is set to 1, and the FB Tx Type subfield is set to 0, the unsolicited MFB indicates one of transmission diversities using an unbeamformed VHT PPDU or an STBC (space-time block coding) VHT PPDU. If unsolicited MFB subfield is set to 1, and the FB Tx Type subfield is set to 1, the unsolicited MFB indicates the beamformed SU-MIMO (Single User MIMO) VHT PPDU. Otherwise, it is reserved. |
| Unsolicited MFB | Unsolicited MCS feedback indicator | If the MFB is not a response to the MRQ, this subfield is set to 1. If the MFB is a response to the MRQ, this subfield is set to 0. |
| AC Constraint | | If a response to the RDG includes a data frame from a certain traffic identifier (TID), this subfield is set to 0. If the response to the RDG includes only a frame from the same AC as that of the last data frame received from the same reverse direction (RD) initiator, this subfield is set to 1. |
| RDG/More PPDU | | The RDG/More PPDU subfield set to 0 indicates that there is no RDG if the RD initiator is transmitted, and indicates that the PPDU transmitting the MAC frame is the final transmission if an RD responder is transmitted. The RDG/More PPDU subfield set to 1 indicates that there is an RDG if the RD initiator is transmitted, and indicates that another PPDU follows the PPDU transmitting the MAC frame, if the responder is transmitted. |

Each of the aforementioned subfields, which are examples of subfields that can be included in the HT Control field, may be replaced with another subfield or may include an additional subfield.

Meanwhile, the MAC sublayer transfers a MAC protocol data unit (MPDU) to a physical layer (PHY) as a PHY service data unit (PSDU). The PLCP entity adds a PHY header and a preamble to the received PSDU to create a PLCP protocol data unit (PPDU).

Figure 10:
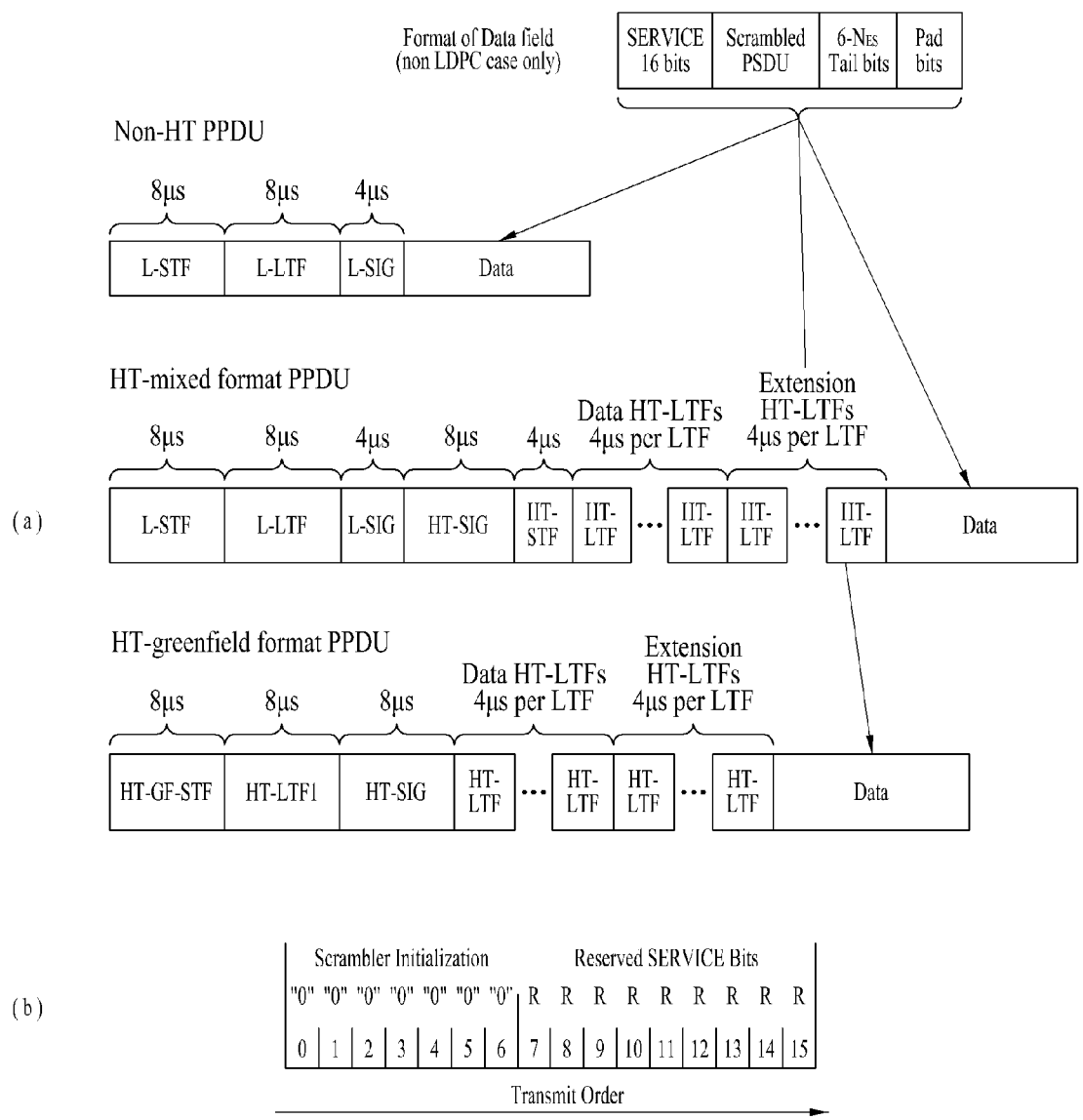
FIG. 10 exemplarily shows PPDU frame formats of an IEEE 802.11n system to which the present invention is applicable.

FIG. 10 exemplarily shows PPDU frame formats of an IEEE 802.11n system to which the present invention is applicable.

FIG. 10(a) exemplarily shows PPDU frames according to a Non-HT format, an HT-mixed format, and an HT-greenfield format.

The Non-HT format represents a frame format for STAs of a conventional legacy system (IEEE 802.11a/g). A Non-HT format PPDU includes a legacy format preamble configured with an L-STF (Legacy-Short Training field), an L-LTF (Legacy-Long Training field), and an L-SIG (Legacy-Signal) field.

The HT-mixed format represents allows communication by STAs of a conventional legacy system, and at the same time represents a frame format for STAs of IEEE 802.11n. An HT-mixed format PPDU includes a legacy format preamble configured with an L-STF, an L-LTF and an L-SIG and an HT format preamble configured with an HT-STF (HT-Short Training field), an HT-LTF (HT-Long Training field) and an HT-SIG (HT-Signal) field. Since the L-STF, L-LTF and L-SIG represents legacy fields for backward compatibility, the fields from the L-STF to the L-SIG are identical to those of the Non-HT format, an STA may identify the mixed format PPDU using the HT-SIG field subsequent to these fields.

The HT-greenfield format, which is not compatible with the conventional legacy system, represents a frame format for STAs of IEEE 802.11n. The HT-greenfield format PPDU includes a greenfield preamble configured with an HT-GF-STF (HT-Greefield-STF), an HT-LTF1, an HT-SIG, and at least one HT-LTF.

The Data field includes a SERVICE field, a PSDU, tail bits, and pad bits. All the bits of the Data field are scrambled.

FIG. 10(b) shows the SERVICE field included in the Data field. The Service field has 16 bits. Numbers from 0 to 15 are assigned to the bits respectively, the bits are sequentially transmitted from bit #0. The bits from bit #0 to bit #6 are set to 0 and used to synchronize the descrambler in the receiver.

Figure 11:
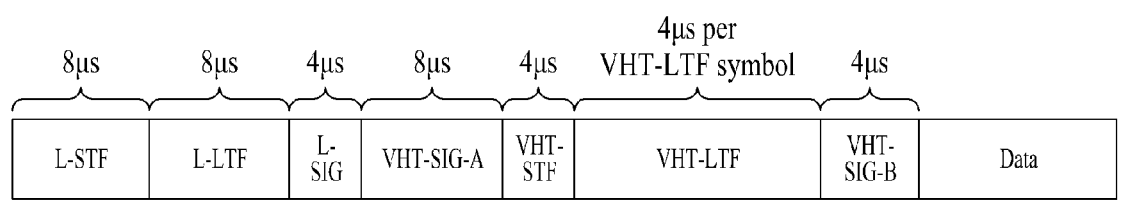
FIG. 11 exemplarily shows a VHT PPDU frame format of an IEEE 802.11ac system to which the present invention is applicable.

FIG. 11 exemplarily shows a VHT PPDU frame format of an IEEE 802.11ac system to which the present invention is applicable.

Referring to FIG. 11, a VHT format PPDU includes, prior to the Data field, a legacy format preamble configured with an L-STF, an L-LTF, and L-SIG and a VHT format preamble configured with a VHT-SIG-A, a HT-STF and a HT-LTF. Since the L-STF, L-LTF and L-SIG represents legacy fields for backward compatibility, the fields from the L-STF to the L-SIG are identical to those of the Non-HT format, and an STA may identify the VHT format PPDU using the VHT-SIG field subsequent to these fields.

The L-STF is a field for frame detection, auto gain control (AGC), diversity detection, coarse frequency/time synchronization, and the like. The L-LTF is a field for fine frequency/time synchronization, channel estimation, and the like. The L-SIG is a field for transmission of legacy control information. The VHT-SIG-A is a VHT field for transmission of control information shared by the VHT STAs. The VHT-STF is a field for AGC for MIMO and beamformed streams. The VHT-LTF is a field for channel estimation for MIMO and beamformed streams. The VHT-SIG-B is a field for transmission of STA-specified control information.

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing an radio frequency channel or medium in a predetermined time interval (e.g., DCF Inter-Frame Space (DIFS), prior to data transmission. If it is determined in the sensing that the medium is in the idle status, frame transmission begins through the medium. On the other hand, if it is sensed that the medium is in the occupied status, the AP and/or STA does not start its own transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive the data frame. In addition, the HCF includes enhanced distributed channel access (EDCA) and HCF controlled channel access (HCCA). EDCA is achieved when the access scheme provided to multiple users by a provider is based on contention. HCCA is achieved by the contention-free channel access scheme using the polling mechanism. In addition, the HCF includes a medium access mechanism for improving Quality of Service (QoS) of the WLAN, and may transmit QoS data in both the contention period (CP) and the contention free period (CFP).

Figure 12:
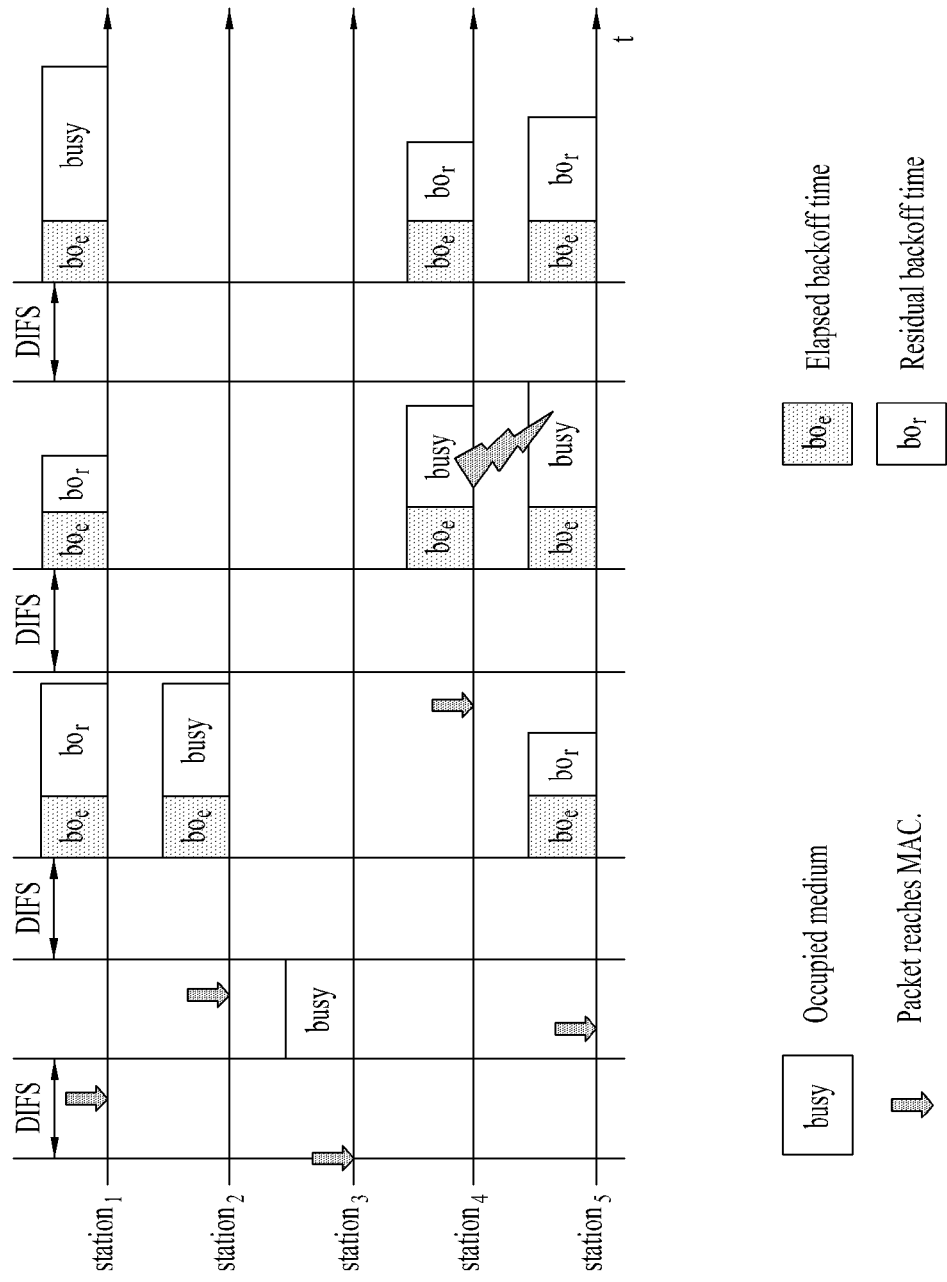
FIG. 12 illustrates a backoff process in a WLAN system to which the present invention is applicable.

FIG. 12 illustrates a backoff process in a WLAN system to which the present invention is applicable.

Operations based on a random backoff period will be described below with reference to FIG. 12.

If the medium is shifted from the occupied or busy status to the idle status, several STAs may attempt to transmit data (or frame). As a method to minimize collisions, each STA selects a random backoff count, waits for a slot time corresponding to the selected backoff count, and then attempts to start transmission. The random backoff count has a value of a pseudo-random integer, and may be set to one of 0 to a CW value. Herein, CW is a contention window parameter value. Although the CW parameter is given CWmin as the initial value, the initial value may be doubled if transmission is failed (for example, if ACK of the transmission frame is not received). If the CW parameter value becomes CWmax, CWmax is maintained until data transmission is successful, and at the same time data transmission may be attempted. If data transmission was successful, the CW parameter value is reset to CWmin. Preferably, the values of CW, CWmin, and CWmax are set to 2n−1 (where n=0, 1, 2, . . . ).

Once the random backoff process begins, the STA continuously monitors the medium while counting down the backoff slot according to a determined backoff count value. If the medium is monitored as being in the occupied status, the STA stops the countdown and waits for a predetermined time. If the medium is in the idle status, the remaining countdown restarts.

In the example shown in FIG. 12, if a packet to transmit reaches MAC of STA3, the STA3 confirms that the medium is in the idle status in the DIFS, and may immediately start frame transmission. In the meantime, the remaining STAs monitor the busy status of the medium, and wait. During the predetermined time, data to be transmitted may occur in each of STA1, STA2, and STA5. If the medium is found in the idle status through monitoring, each STA waits for the DIFS time and then performs countdown of the backoff slot according to a random backoff count value selected by each STA. In the example shown in FIG. 12, STA2 selects the least backoff count value and STA1 selects the greatest backoff count value. That is, at the time when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle status, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, data to be transmitted may occur in STA4 while STA2 occupies the medium. In this case, when the medium is in the idle status, STA4 may wait for the DIFS time, perform countdown according to the random backoff count value selected by the STA4, and then start frame transmission. FIG. 12 exemplarily shows the case in which the residual backoff time of STA5 is equal to the random backoff count value of STA4 by chance. In this case, a collision may occur between STA4 and STA5. If collision occurs between STA4 and STA5, none of STA4 and STA5 receives ACK, and accordingly data transmission is failed. In this case, each of STA4 and STA5 may double the CW value, select a random backoff count value and then perform countdown. Meanwhile, STA1 waits while the medium is in the occupied status due to transmission operation by STA4 and STA5. In this case, when the medium returns to the idle status, STA1 waits for the DIFS time, and then starts frame transmission after elapse of the residual backoff time.

Sensing Operation of STAs

As described above, the CSMA/CA mechanism includes not only a physical carrier sensing through which the AP and/or STA directly sense the medium, but also a virtual carrier sensing. The virtual carrier sensing is performed to address some problems (such as a hidden node problem) encountered in the medium access. For the virtual carrier sensing, MAC of the WLAN system may use a network allocation vector (NAV). By means of the NAV value, the AP and/or STA which is using the medium or has authority to use the medium indicates, for another AP and/or another STA, the remaining time until the medium becomes available. Accordingly, the NAV value may correspond to a reserved period in which the medium will be used by the AP and/or STA transmitting a frame. An STA receiving the NAV value may be prohibited from medium access during the reserved period. For example, NAV may be set according to the value of a duration field of the MAC header of the frame.

A robust collision detect mechanism has been introduced to reduce the probability of such collision. This mechanism will be described with reference to FIGS. 13 and 14. The actual carrier sensing range may not be identical to the transmission range, but for simplicity of description, it will be assumed that the actual carrier sensing range is identical to the transmission range.

FIG. 13 illustrates a hidden node and an exposed node.

FIG. 13(a) exemplarily shows a hidden node, in which STA A communicates with STA B, and STA C has information to be transmitted. Specifically, STA C may determine that the medium is in the idle status when performing carrier sensing prior to transmission of data to STA B, even under the situation in which STA A is transmitting information to STA B. This is because transmission by STA A (i.e., occupied medium) may not be sensed at the location of STA C. In this case, collision may occur since STA B receives information of STA A and information of STA C simultaneously. Here, STA A may be considered as a hidden node of STA C.

FIG. 13(b) exemplarily shows an exposed node, in which STA C has information to be transmitted to STA D under a situation in which STA B is transmitting data to STA A. In this case, when STA C performs carrier sensing, it may be determined that the medium is occupied due to transmission by STA B. Therefore, although STA C has information to be transmitted to STA D, the STA C should wait until the medium returns to the idle status since the occupied status of the medium is sensed. However, since STA A is actually located out of the transmission range of STA C, transmission from STA C may not collide with transmission from STA B from the viewpoint of STA A, and STA C is unnecessarily waiting until STA B stops transmission. Here, STA C may be viewed as an exposed node of STA B.

FIG. 14 illustrates RTS and CTS.

In order to efficiently utilize the collision avoidance mechanism under the exemplary situation as shown in FIG. 13, short signaling packets such as RTS (request to send) and CTS (clear to send) may be used. RTS/CTS between two STAs may be overheard by peripheral STA(s), such that the peripheral STA(s) may consider whether information is communicated between the two STAs. For example, if an STA to transmit data transmits the RTS frame to another STA to receive data, the STA to receive data may transmit the CTS frame to peripheral STAs, thereby informing the peripheral STAs that the STA is going to receive data.

FIG. 14(a) exemplarily shows a method to solve the hidden node problem. The method assumes a situation under which both STA A and STA C is to transmit data to STA B. If STA A transmits RTS to STA B, STA B transmits CTS to both STA A and STA C located around the STA B. As a result, STA C waits until STA A and STA B stop data transmission, and thus collision is avoided.

FIG. 14(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit an RTS to all peripheral STAs, and transmits CTS only to STA A actually having data to transmit. Since STA C receives only the RTS, but fails to receive the CTS of STA A, STA C may recognize that STA A is located out of the carrier sensing range of STA C.

Inter-Frame Space (IFS)

A time gap between two frames is defined as an inter-frame space (IFS). The ST determines, through carrier sensing, whether a channel is used in the IFS. The DCF MAC layer defines four IFSs, Thereby, priorities to occupy a WM are determined.

Each of the IFSs is set to a specific value according to a PHY, regardless of the bit rates of the STAs. The IFSs include a short IFS (SIFS), a PCF IFS (PIFS), a DCF IFS (DIFS), and an extended IFS (EIFS). The short IFS (SIFS) is used in transmitting RTS/CTS and the ACK frame, and has the highest priority. The PCF IFS (PIFS) is used in transmitting the PCF frame, and the DCF IFS (DIFS) is used in transmitting the DCF frame. The extended IFS (EIFS) is used only when an error occurs in frame transmission and does not have a fixed length.

The relationship between the IFSs is defined by the time gaps on the medium, and relevant attributes are provided by PHYs as shown in FIG.

Figure 15:
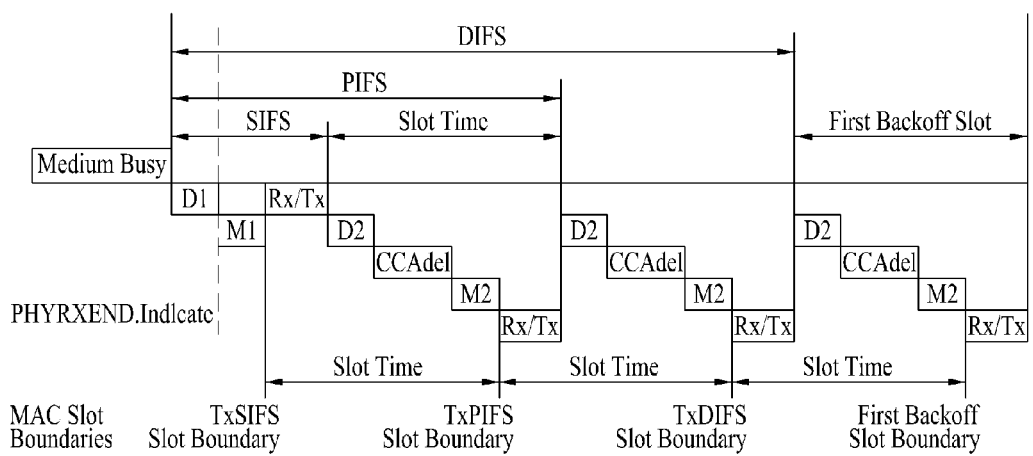
FIG. 15 illustrates an exemplary relationship between IFSs.

FIG. 15 illustrates an exemplary relationship between IFSs.

In the entire medium timing, the termination time point of the last symbol of a PPDU indicates termination of transmission, and the first symbol of the preamble of the next PPDU indicates start of transmission. The entire timing may be set with reference to PHY-TXEND.confirm primitive, PHYTXSTART.confirm primitive, PHY-RXSTART.indication primitive and PHY-RXEND.indication primitive.

Referring to FIG. 15, the SIFS time (aSIFSTime) and the slot time (aSlotTime) may be determined for the respective PHYs. The SIFS time may have a fixed, and the slot time may dynamically change according to change of the wireless delay time (aAirPropagationTime). The SIFS time and slot time are defined respectively by Equations 1 and 2 given below.

$$aSIFSTime = aRxRFDelay + aRxPLCPDelay + aMACProcessingDelay + aRxTxTurnaroundTime \quad \text{Equation 1}$$

$$aSlotTime = aCCATime + aRxTxTurnaroundTime + aAirPropagationTime + aMACProcessingDelay \quad \text{Equation 2}$$

PIFS and SIFS are defined respectively in Equation 3 and 4 given below.

$$PIFS=aSIFSTime+aSlotTime \qquad \text{Equation 3}$$

$$DIFS=aSIFSTime+2*aSlotTime \qquad \text{Equation 4}$$

EIFS is calculated from SIFS, DIFS and ACK transmission time (ACKTxTime) as in Equation 5 given below. ACK transmission time (ACKTxTime) is expressed in microseconds necessary for transmission of an ACK frame containing a preamble, a PLCP header and additional PHY-dependent information at the lowest PHY mandatory rate.

$$EIFS=aSIFSTime+DIFS+ACKTxTime \qquad \text{Equation 5}$$

In the example shown in FIG. 15, SIFS, PIFS and DIFS measured on different MAC slot boundaries (TxSIFS, TxPIFS, TxDIFS) of the medium. A slot boundary is defined as the time at which the transmitter is turned on by the MAC layer to match different IFS timings on the medium after detection of a CCA result of the previous slot time. The MAC slot boundaries for SIFS, PIFS and DIFS are defined by Equations 6 to 8 given below.

$$TxSIFS=SIFS-aRxTxTurnaroundTime \qquad \text{Equation 6}$$

$$TxPIFS=TxSIFS+aSlotTime \qquad \text{Equation 7}$$

$$TxDIFS=TxSIFS+2*aSlotTime \qquad \text{Equation 8}$$

Power Management

As described above, STAs in the WLAN system should perform channel sensing before they perform transmission/reception operation. Always performing the channel sensing causes persistent power consumption of the STA. There is not much difference in power consumption between the reception status and the transmission status, continuous maintenance of the reception status may cause large load to the STAs provided with limited power (i.e., operated by a battery). Therefore, if STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. If the STA is in the awake state, the STA may normally perform frame transmission/reception, channel scanning, or the like. On the other hand, the STA operating in the PS mode is switched from the sleep state to the awake state or vice versa. The STA switched to the sleep state operates with minimum power, and does not perform either frame transmission/reception or channel scanning.

The amount of power consumption is reduced according to increase of time for which the STA stays in the sleep state such that that the STA operation time is increased. However, since transmission or reception of the frame is not possible in the sleep state, the STA cannot operate unconditionally for a long period of time. If the STA operating in the sleep state has a frame to transmit to the AP, it may be switched to the awake state to transmit/receive a frame. On the other hand, if the AP has a frame to transmit to the STA, the STA in sleep-state is unable to receive the frame and to recognize presence of a frame to receive. Accordingly, the STA may need to be switched to the awake state according to a specific period in order to recognize the presence or absence of a frame to be transmitted to the STA (or in order to receive the frame if the frame is present).

Figure 16:
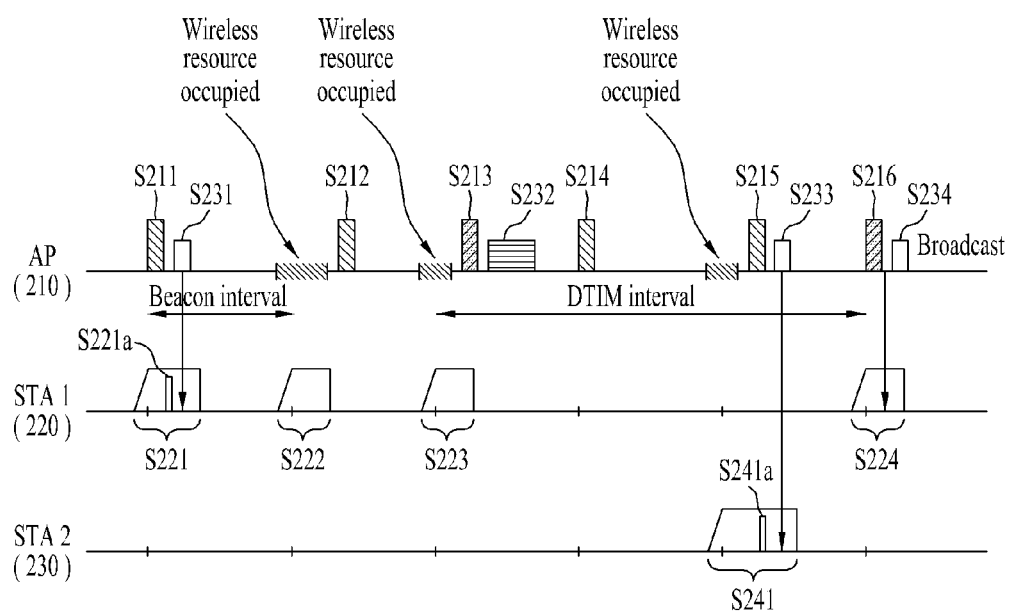
FIG. 16 illustrates a power management operation.

FIG. 16 illustrates a power management operation.

Referring to FIG. 16, AP 210 transmits a beacon frame to STAs present in the BSS at intervals of a predetermined time period (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once whenever the beacon frame is transmitted three times.

STA1 220 and STA2 222 are operating in the PS mode. Each of STA1 220 and STA2 222 may be set to be switched from the sleep state to the awake state at every wakeup interval of a predetermined period to receive the TIM element transmitted by the AP 210. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 220 can switch to the awake state at every beacon interval to receive the TIM element. Accordingly, STA1 220 may switch to the awake state (S221) when AP 210 transmits the beacon frame for the first time (S221). Thereby, STA1 220 may receive the beacon frame and acquire the TIM element. If the acquired TIM element indicates that there is a frame to be transmitted to STA1 220, STA1 220 may transmit a power save-Poll (PS-Poll) frame, which requests transmission of the frame, to the AP 210 (S221a). In response to the PS-Poll frame, the AP 210 may transmit the frame to STA 1 220 (S231). Having received the frame, STA1 220 is switched back to the sleep state to operate in the sleep state.

In secondly transmitting the beacon frame, the medium is in the busy status in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but it does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy status, the AP 210 transmits the beacon frame at a delayed time (S213). STA1 220 is switched to the awake state in accordance with the beacon interval, and may acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and be switched back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it did not acquire information indicating presence of buffered traffic for STA1 220 through the two previous operations of reception of the TIM element.

Alternatively, provided that signaling information for adjustment of the value of the wakeup interval of STA1 220 is contained in the beacon frame transmitted by the AP 210, the wakeup interval value of the STA1 220 may be adjusted. In this example, STA1 220, which has been switched between the operating states at every beacon interval to receive a TIM element, may be set to be switched to the awake state once at every three beacon intervals. Therefore, when the AP 210 fifthly transmits the beacon frame (S215) after the fourth transmission of the beacon frame (S214), STA1 220 maintains the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set by STA2 230 may have a greater length than the wakeup interval of STA1 220. Accordingly, STA2 230 is switched to the awake state at the time (S215) when the AP 210 fifthly transmits the beacon frame, such that the STA2 230 may receive the TIM element (S241). STA2 230 recognizes presence of a frame to be transmitted thereto to the STA2 230 through the TIM element, and transmits the PS-Poll frame to the AP 210 in order to request frame transmission (S241a). The AP 210 may transmit the frame to STA2 230 in response to the PS-Poll frame (S233).

In order to operate/manage the PS mode as shown in FIG. 16, the TIM element includes a TIM indicating presence or absence of a frame to be transmitted to the STA or a DTIM indicating presence or absence of a broadcast/multicast frame. The DTIM may be implemented through field setting of the TIM element.

Figure 17:
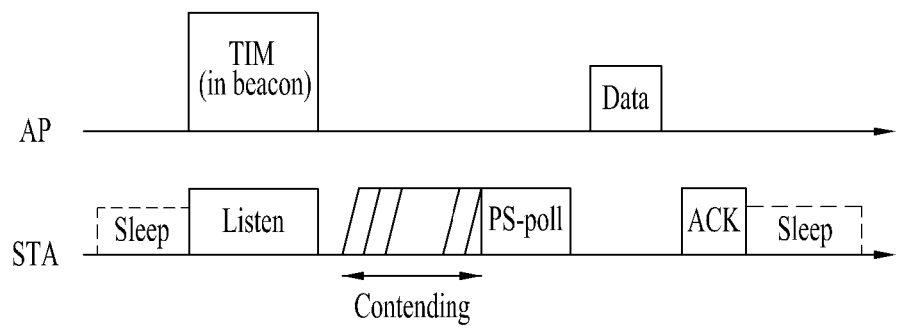
FIGS. 17 to 19 illustrate detailed operations of an STA having received a TIM.
Figure 18:
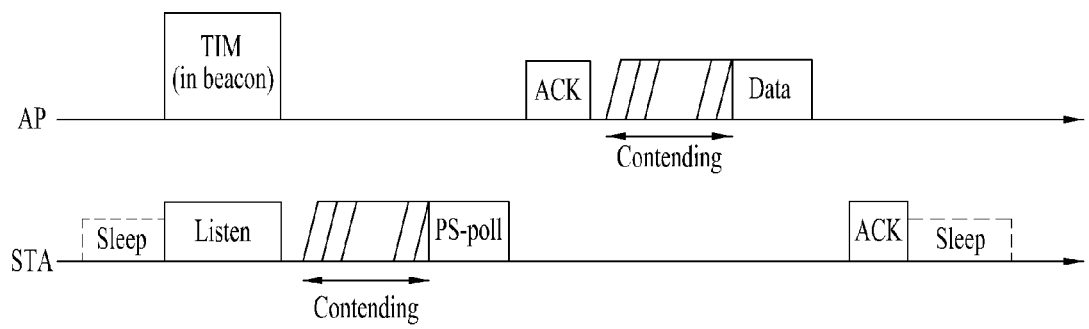
Figure 19:
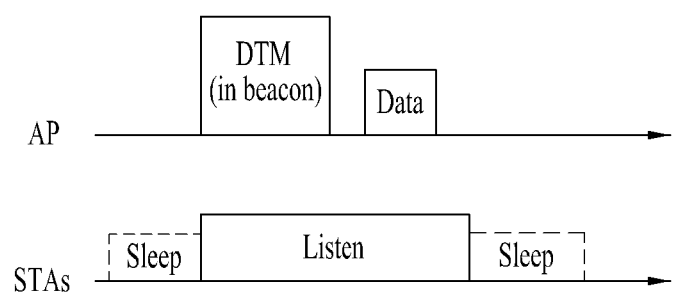

FIGS. 17 to 19 illustrate detailed operations of an STA having received a TIM.

Referring to FIG. 17, STA is switched from the sleep state to the awake state so as to receive the beacon frame including a TIM from the AP. STA interprets the received TIM element such that it can recognize presence of buffered traffic to be transmitted to thereto. After STA contends with other STAs to access the medium for PS-Poll frame transmission, the STA may transmit the PS-Poll frame to the AP to request data frame transmission. The AP having received the PS-Poll frame transmitted by the STA may transmit the frame to the STA. The STA may receive the data frame and then transmit an ACK frame to the AP in response to the received data frame. Thereafter, the STA may be switched back to the sleep state.

As shown in FIG. 17, the AP may operate in an immediate response manner in which the AP transmits the data frame when a predetermined time (e.g., a short inter-frame space (SIFS)) elapses after the AP receives the PS-Poll frame from the STA and. On the other hand, the AP may operate in a deferred response manner if the AP fails to prepare a data frame to be transmitted to the STA for the SIFS time after receiving the PS-Poll frame, which will be described in detail with reference to FIG. 18.

In the example of FIG. 18, the operations of the STA switching from the sleep state to the awake state, receiving a TIM from the AP, and transmitting the PS-Poll frame to the AP through contention are identical to those of the example of FIG. 16. If the AP having received the PS-Poll frame fails to prepare a data frame for the SIFS time, the AP may transmit the ACK frame to the STA instead of transmitting the data frame. If the data frame is prepared after transmission of the ACK frame, the AP may transmit the data frame to the STA after performing contention. The STA may transmit the ACK frame indicating successful reception of the data frame to the AP, and then be switched to the sleep state.

FIG. 19 shows an exemplary case in which AP transmits DTIM. STAs may be switched from the sleep state to the awake state so as to receive the beacon frame including a DTIM element from the AP. STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While STAs continuously maintains the awake state after receiving the beacon frame including the DTIM, the STAs may receive data, and then switch back to the sleep state after data reception is completed.

In the method for management of the PS mode on the basis of the TIM (or DTIM) protocol as described above with reference to FIGS. 17 to 19, each of the STAs may recognize presence of a data frame to be transmitted thereto, through STA identification information included in the TIM element. The STA identification information may be information related to an association identifier (AID) assigned to the corresponding STA when the STA is associated with the AP.

The AID is used as a unique identifier for each of the STAs within one BSS. For example, in the current WLAN system, the AID is assigned with one value between 1 and 2007. In the currently defined WLAN system, 14 bits for the AID may be allocated to a frame transmitted by an AP and/or STA, values ranging up to 16383 can be assigned to the AID, but the values from 2008 to 16383 may be set to be reserved values.

FIG. 20 illustrates an exemplary format of a TIM element.

Referring to FIG. 20, the TIM element format includes an Element ID field, a Length field, a DTIM Count field, a DTIM Period field, a Bitmap Control field, and a Partial Virtual Bitmap field. The Length field indicates the length of information field. The DTIM Count field indicates the number of beacon frames remaining before the next DTIM is transmitted. The DTIM Period field indicates the number of beacon intervals between continuous DTIMs. If all TIMs are DTIMs, the DTIM period field is set to 1. The values of the DTIM Period, among which 0 is reserved, consist of one octet. The Bitmap Control field consists of one octet. Bit 0 of the Bitmap Control field is the Traffic Indicator bit for AID 0. If one or more group addressed MSDUs (MAC service data unit)/MMPDUs (MAC management protocol data unit) have data to be transmitted to AP or mesh STA, the DTIM Count field is set to 0, and Bit 0 of the Bitmap Control field is set to 1. The remaining 7 bits of the first octet indicate bitmap offset. The traffic-indication virtual bitmap by the AP or mesh STA that produces TIM consists of 2008 bits (=251 octets). In the bitmap, the bit number N ($0<=N<=2007$) may be indicated by the octet number N/8 and the bit number (N mod 8). Each bit in the traffic-indication virtual bitmap indicates presence or absence of data to be transmitted by the AP. If there is data to be transmitted by the AP for the individually addressed MSDU/MMPDU (AID=N), the bit number N is set to 1. If there is not data to be transmitted, the bit number N is set to 0.

Each of the aforementioned fields, which are examples of fields that can be included in the TIM element, may be replaced with another field or include an additional field.

Power Management Using Automatic Power Saving Delivery

The IEEE 802.11e system provides an automatic power saving delivery (APSD) method as well as the aforementioned PS method, which is based on PS-Poll. The APSD method is broadly classified into a scheduled-APSD (S-APSD:) method and an unscheduled-APSD (U-APSD:). The U-APSD represents a mechanism in which an AP (QoS AP) supporting the APSD operates in the power save mode switching between the awake state and the doze state, and at the same time transmits a downlink frame to an STA (QoS STA) which supports the APSD.

The Quality of Service (QoS) AP capable of supporting the APSD may use a beacon, a probe response, and an APSD subfield of the Capability Information field in the (re) association response management frame to signal the capability to the STA.

STAs may use the U-APSD to receive some or all of the bufferable units of the STAs transmitted from the AP during the unscheduled-service period (hereinafter, referred to as "u-SP"). If it is not the u-SP, STA transmits QoS data or a QoS Null frame belonging to an AC set to "trigger-enabled" to the AP, thereby starting the u-SP. The uplink frame transmitted at this time is referred to as a trigger frame. An aggregate MPDU (A-MPDU) includes one or more trigger frames. The u-SP is terminated after the AP attempts transmission of a transmissible AC and at least one BU reserved for a corresponding STA. However, if the Max SP Length field of the QoS capability element of a (re)association request frame of the corresponding STA has a value other than 0, the u-SP is limited within the value indicated by the aforementioned field.

In order to receive BU from the AP during the u-SP, the STA specifies one or more delivery-enabled and trigger-enabled ACs of the STA. In the IEEE 802.11e system, eight different priorities and four ACs, which are based on the priorities, are defined to provide QoS. The STA may perform the setting operation using two methods to allow the AP to use the U-APSD. First, the STA may set an individual U-APSD flag bit in the QoS information (QoS Info) subfield of the QoS Capability element transmitted from the (re) association request frame. If the U-APSD flag bit is 1, it indicates that the corresponding AC is transmissible and trigger-enabled. When all four U-APSD flag subfields in the (re)association request frame are set to 1, all the ACs related to the STA are transmissible and trigger-enabled during the (re)association. When all four U-APSD flag subfields in the (re)association request frame are set to 0, none of the ACs related to the STA is transmissible and trigger-enabled during the (re)association. Alternatively, the STA may specify one or more trigger-enabled and transmissible ACs by transmitting, to the AP, an add traffic stream (ADDTS) request frame (ADDTS Request frame) having an APSD subfield set to 1 for each AC and the Schedule subfield set to 0 in the traffic stream information field (TS Info field) of the traffic specification element (TSPEC element). Setting of APSD in the TSPEC request may be put above setting of static U-APSD transmitted in the QoS Capability element. In other words, the TSPEC request may be overwritten in certain previous U-APSD setting of AC. This request may be transmitted for an AC having an ACM subfield set to 0.

The STA may set the AC to be trigger-enabled or transmissible by setting TSPEC having the APSD subfield set to 1 and the Schedule subfield set to 0 in the uplink or downlink transmission direction. For the uplink TSPEC, downlink TSPEC or bidirectional TSPEC which has the APSD subfield set to 1 and the Schedule subfield set to 0, the AC may be set to be trigger-enabled and transmissible. For the uplink TSPEC, downlink TSPEC or bidirectional TSPEC which has both the APSD subfield and the Schedule field set to 0, the AC may be set to be trigger-disabled and non-transmittable.

The scheduled-service period (hereinafter, referred to as "s-SP") beings with a specific fixed time interval in the Service Interval field. If the access policy controls channel access, the STA may transmit, to the AP, the ADDTS Request frame having the APSD subfield of TS Info field sent to 1 in the TSPEC element, in order to use the s-SP for a TS. On the other hand, if the access policy supports contention-based channel access, the STA may transmit, to the AP, the ADDTS Request frame having the APSD subfield the Schedule field set to 1 in the TS Info field of the TSPEC element, in order to use the s-SP for the TS. If the APSD mechanism is supported by the AP and the AP accepts the corresponding ADDTS Request frame from the STA, the AP may respond with a ADDTS Response frame including the Schedule element which indicates that the requested service can be provided by eth AP. If the lower four octets of a timing synchronization function (TSF) timer is equal to a specific value of the Service Start Time field, the initial s-SP begins. The STA using the s-SP may wake up for the first time to receive a buffered and/or polled BU individually addressed to the STA by an AP or hybrid coordinator (HC). Thereafter, the STA may wake up at certain time intervals identical to the service intervals (SIs). The AP may adjust the service start time through the successful ADDTS Response frame (a response to the ADDTS Request frame) the Schedule element in the schedule frame (transmitted at a different time).

The s-SP begins at the service start time indicated in the Schedule element transmitted in response to the TSPEC and at the scheduled wake-up time corresponding to the SI. Thereafter, the STA wakes up at the time points according to Equation 9 given below.

$$(TSF - \text{servicestarttime}) \bmod \text{minimumSI} = 0 \qquad \text{Equation 9}$$

When the s-SP period is supported in BSS, the STA may use both U-APSD and S-APSD for different ACs for the same time. When scheduled transmission for an AC is set in the STA, the AP neither transmits a BU using the AC during the SP initiated by a trigger frame, nor processes the BU using the AC received from the STA through the trigger frame. The AP does not reject a certain ADDTS Request frame indicating use of both S-APSD and U-APSD for use of the same AC for the same time. The APSD may be used only for transmission of an individually addressed BU. Transmission of a group-addressed BU may comply with a frame transmission rule for group-addressed BUs.

A non-AP STA using U-APSD cannot receive nay of the frames transmitted from the AP during the service period due to interference observed by the non-AP STA. In this case, the AP may determine that the frame is not correctly received by the non-AP STA even if the same interference is not observed. The U-APSD coexistence capability allows the non-AP STA to indicate, for the AP, transmission duration requested for use thereof during the u-SP. By using the transmission duration, the AP may transmit a frame during the SP, the non-AP STA may have an improved probability of reception of the frame even if it is subjected to interference. The U-APSD coexistence capability reduces the chance of the AP failing to successfully receive the frame from the AP.

FIG. 21 illustrates an exemplary format of a U-APSD coexistence element.

Referring to FIG. 21, the Element ID field has the same value as that of the U-APSD coexistence. The Length field has a value obtained by adding the length of the additional subelements to 12. A value of the TSF 0 Offset) field other than indicates a number of microseconds after the time (TSF time 0) at which the non-AP STA recognize start of interference. The AP uses the TSF 0 Offset field and the Interval/Duration field for transmission to the non-AP STA.

An STA for which "dot11MgmtOptionUAPSDCoexistenceActivated" has the "true" value is defined as an STA configured to support the U-APSD coexistence. Herein, in the case of an STA for which "dot11MgmtOption-UAPSDCoexistenceActivated" has the "true" value, the U-APSD Coexistence field of the Extended Capabilities element is set to 1. Otherwise, it is set to 0. The non-AP STA associated with the AP (in a case in which both the non-AP STA and the AP have notified support of the U-APSD coexistence capability before) may transmit the ADDTS Request frame including the U-APSD Coexistence element to the AP.

Hereinafter, content of an ADDTS Request frame that does not include the U-APSD Coexistence element will be referred to as the Base ADDTS Request. Upon successfully receiving the ADDTS Request frame, the AP processes the content of the Base ADDTS Request frame. If the AP determines that the Base ADDTS Request is not approvable, it does not process the U-APSD Coexistence element. On the other hand, if the AP determines that the Base ADDTS Request is approvable, it processes the U-APSD Coexistence element. If the AP supports transmission of a frame for a specific duration value in the Interval/Duration field of the U-APSD Coexistence element during the U-APSD service period, the AP may approve the ADDTS request. Otherwise, the AP may reject the ADDTS request.

If the AP has approved the ADDTS request having the U-APSD coexistence before, a non-AP STA continuing to use a QoS service provided by an ADDTS Request frame which does not include the U-APSD Coexistence may terminate use of the U-APSD coexistence by transmitting the ADDTS Request frame which does not include the U-APSD Coexistence element. If the non-AP STA desires to terminate use of all QoS services by the ADDTS Request frame including the U-APSD Coexistence, the non-AP STA may transmit a delete traffic stream (DELTS) Request frame (DELTS Request frame) to the AP.

If the previous ADDTS Request frame is made invalid by the last ADDTS Request frame that has been successfully received, the non-AP STA may transmit multiple ADDTS Request frames to the AP. An AP supporting the U-APSD coexistence and accepting the ADDTS request may limit the duration of the U-APSD coexistence service according to a parameter specified in the U-APSD Coexistence element of the ADDTS frame. In addition, the AP transmits a frame to the non-AP STA according to the following rule to make a request.

First, if the non-AP STA specifies a value of TSF 0 Offset other than 0 in the U-APSD Coexistence element, the AP does not transmit a frame to the non-AP STA for the time out of the U-APSD coexistence service period. The U-APSD coexistence service period begins when the AP receives the U-APSD trigger frame, and then ends after the transmission period specified by Equation 10 given below.

$$\text{End of transmission period} = T + (\text{Interval} = (T - \text{TSF0Offset}) \bmod \text{Interval}))$$ Equation 10

In Equation 10, T denotes the time at which the U-APSD trigger frame is received by the AP. In addition, Interval indicates the earliest one of the value of the Duration/Interval field of the U-APSD Coexistence element and the time at which transmission having the EOSP (end of service period) bit set to 1 is successful.

On the other hand, if the non-AP STA specifies 0 as the values of TSF 0 Offset in the U-APSD Coexistence element, the AP does not transmit a frame to the non-AP STA for the time out of the U-APSD coexistence service period. The U-APSD coexistence service period starts when the AP receives the U-APSD trigger frame, and ends after a transmission period specified by Equation 11 given below.

Equation 11

In Equation 10, T denotes the time at which the U-APSD trigger frame is received by the AP. In addition, In addition, Duration indicates the earliest one of the value of the Duration/Interval field of the U-APSD Coexistence element and the time at which transmission having the EOSP bit set to 1 is successful.

If the AP determines during the U-APSD coexistence service period that the AP has another frame to be transmitted and that this frame will be successfully transmitted before the end of the service period, it may set the More bit to 1.

If the AP expects the last frame to be transmitted to the non-AP STA during the U-APSD coexistence service period, it may set the EOSP bit to 1 in the corresponding frame. If the last frame is not successfully transmitted to the non-AP STA before the end of the U-APSD coexistence service period, the AP transmits a QoS null frame with the EOSP bit set to 1. The non-AP STA may enter the dose state at the time of end of the U-APSD coexistence service period.

Hidden Node Problem in the PS-Poll

FIG. 22 illustrates operation of an SAT according to a PS-Poll mechanism and a U-APSD mechanism.

FIG. 22(a) illustrates an exemplary PS-Poll mechanism, and FIG. 22(b) illustrates an exemplary U-APSD mechanism.

Referring to FIG. 22(a), the STA may recognize, through the TIM element of the beacon, presence or absence of a buffered traffic to be transmitted thereto by the AP. if a buffered traffic to be transmitted to the STA is present, the STA contends with other STAs according to the PS-Poll mechanism, and then make a request to the AP for transmission of a data frame by transmitting a PS-Poll frame. If the AP fails to prepare a data frame to be transmitted to the STA for the SIFS time after receiving the PS-Poll frame, the AP may transmit an ACK frame to the STA instead of transmitting the data frame. If the data frame is prepared after transmission of the ACK frame, the AP exchanges the RTS/CTS frame with the STA and transmits the data frame to the STA after contending with the other STAs. Herein, the step of exchanging the RTS/CTS frame may be omitted. If reception of the data frame is successful, the STA transmits the ACK frame and then switches to the sleep state. However, if data transmission is performed according to the PS-Poll mechanism, only oe PSDU is allowed to be transmitted to the STA at a time. Accordingly, if the AP has a large amount of data to be transmitted to the STA, transmission may be performed inefficiently.

To address this problem, the STA may receive servers PSDUs from the AP at a time using the aforementioned U-APSD mechanism during its own service period (SP).

Referring to FIG. 22(b), the STA first recognizes through the TIM element of the beacon that the AP has data to be transmitted to the STA. Thereafter, when the STA desires to receive the data, it contends with the other STAs, transmit the trigger frame to the AP to inform that the service period (SP) of the STA has started, and then requests that the AP transmit the data. The AP transmits the ACK frame to the STA in response to the trigger frame. Thereafter, the AP performs contention with the other STAs, exchanges the RTS/CTS frame with the STA, and then transmits the data to the STA. At this time, the data may include several data frames. Herein, the step of exchanging the RTS/CTS frame may be omitted. If the AP transmits the last data frame with the EOSP field of the data frame set to 1, the STA may recognize this, transmit the ACK frame to the AP, end the SP, and then switch to the sleep state. Using the U-APSD mechanism as described above may allow the STA to start its own SP and receive data when it desires and to receive several data frames during one SP, thereby enabling efficient data reception.

However, exchange of the RTS/CTS frame required in data transmission to prevent the hidden node problem leads to a large amount of overhead in data transmission. In addition, a considerable amount time is taken from the time when the STA to makes a request to the AP for data transmission by transmitting the trigger frame to the time when the AP prepares data to be transmitted to the STA and performs contention for transmission of the data, and accordingly the STA unnecessarily consumes energy.

Meanwhile, in the hidden node environment, there are stations that fail to overhear PS-Poll frames transmitted by other stations, and occurrence of collision is highly possible since the PS-Poll frames are transmitted simultaneously. In order to allow an STA operating in the PS mode to receive data from the AP in the hidden node environment so as to address such problems, an NDP (Null Data Packet) PS-Poll frame and an extended slot time which is based on the NDS PS-Poll frame may be used.

Figure 23:
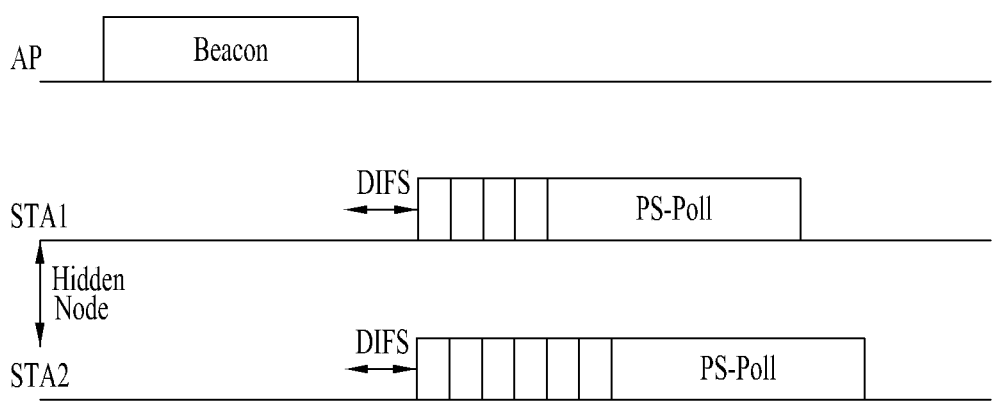
FIG. 23 illustrates an exemplary case of collision between PS-Poll frames in a hidden node environment.

FIG. 23 illustrates an exemplary case of collision between PS-Poll frames in a hidden node environment.

In FIG. 23, it is assumed that the AP has a data frame for STA 1 and STA 2 and that STA 1 and STA 2 have been informed of this fact through the TIM element of the beacon frame. In addition, it is assumed that STA 1 and STA 2 correspond to hidden nodes.

Each of STA 1 and STA 2 attempts channel access through contention. If the backoff count value of STA 1 is 4, and the backoff count value of STA 2 is 6, as shown in FIG. 23, STA 1 first transmits the PS-Poll frame to the AP. If the PS-Poll frame of STA 1 is successfully transmitted to the AP, the AP transmits a buffered data frame for STA 1 or an ACK frame to STA 1. Since STA 2 is a hidden node of STA 1, STA2 fails to monitor the PS-Poll frame transmitted by STA 1, and accordingly may determine that the channel is idle when the PS-Poll frame of STA 1 is transmitted and perform countdown of its own backoff slot. As a result, STA 2 may also transmit a PS-Poll frame to the AP when the countdown value of the backoff slot expires. That is, although STA 1 has first succeeded in channel access and thus transmitted the PS-Poll frame, STA 2 also transmits the PS-Poll frame to the hidden node problem, resulting in collision between the PS-Poll frames.

To address this problem, it is necessary to increase the slot time of a backoff timer used in the contention process over the transmission time of the PS-Poll frame. Herein, the slot time corresponds to a channel idle time unit that is necessary for reduction of the backoff timer in the contention process. Accordingly, when the slot time is increased over the PS-Poll frame transmission time, the AP may successfully receive the PS-Poll frame and transmit a response frame in response to the PS-Poll frame. Since STAs corresponding to the hidden nodes can receive the response frame with which the AP has responded, they recognize that that the channel is in use and thus do not reduce the backoff timer. Accordingly, the hidden node problem of STAs located in a hidden node environment failing to overhear the PS-Poll frame may be addressed by increasing the slot time, i.e., the channel sensing time over the PS-Poll frame transmission time.

Figure 24:
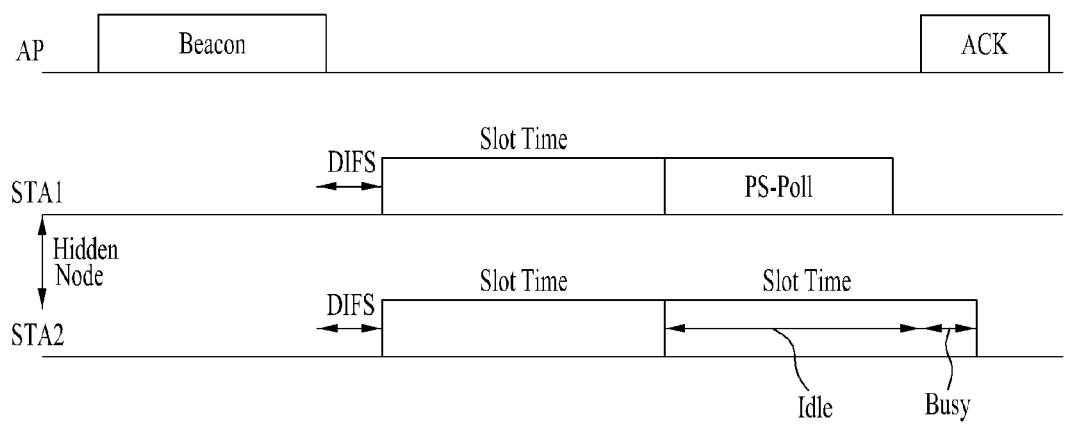
FIG. 24 illustrates an exemplary PS-Poll contention mechanism in a hidden node environment.

FIG. 24 illustrates an exemplary PS-Poll contention mechanism in a hidden node environment.

In FIG. 24, it is assumed that the AP has a data frame for STA 1 and STA 2 and that STA 1 and STA 2 have been informed of this fact through the TIM element of the beacon frame. In addition, it is assumed that STA 1 and STA 2 correspond to hidden nodes.

Each of STA 1 and STA 2 attempts channel access through contention. If the backoff count value of STA 1 is 4, and the backoff count value of STA 2 is 6, as in the case of FIG. 23, STA 1 first transmits the PS-Poll frame to the AP. If the backoff count value of STA 1 is 1, and the backoff count value of STA 2 is 2, STA 1 first transmits the PS-Poll frame to the AP. If the PS-Poll frame of STA 1 is successfully transmitted to the AP, the AP transmits a buffered data frame for STA 1 or an ACK frame to STA 1. Since STA 2 is a hidden node of STA 1, STA2 fails to monitor the PS-Poll frame transmitted by STA 1. Accordingly STA2 determines that the channel is idle when the PS-Poll frame of STA 1 is transmitted, but determines that the channel is busy for the buffered data frame or the ACK frame transmitted after the PS-Poll frame. Accordingly, STA 2 does not perform countdown of its own backoff slot for the time STA1 occupies the channel, and therefore collision between the PS-Poll frames may be avoided.

The slot time for the PS-Poll contention mechanism can be set by Equation 12 given below.

$$\text{SlotTime} = \text{PS-PollTransmissionTime} + \text{SIFS} + \text{CCATimeofResponseframe} + 2 * \text{AirPropagationDelay} \qquad \text{Equation 12}$$

Herein, PS-Poll Transmission Time indicates the transmission time of a PS-Poll frame. CCA Time of Response frame indicates CCA detection time of the STA for transmission of a response frame (a data frame or an ACK frame) by the AP in response to the PS-Poll frame.

Figure 25:
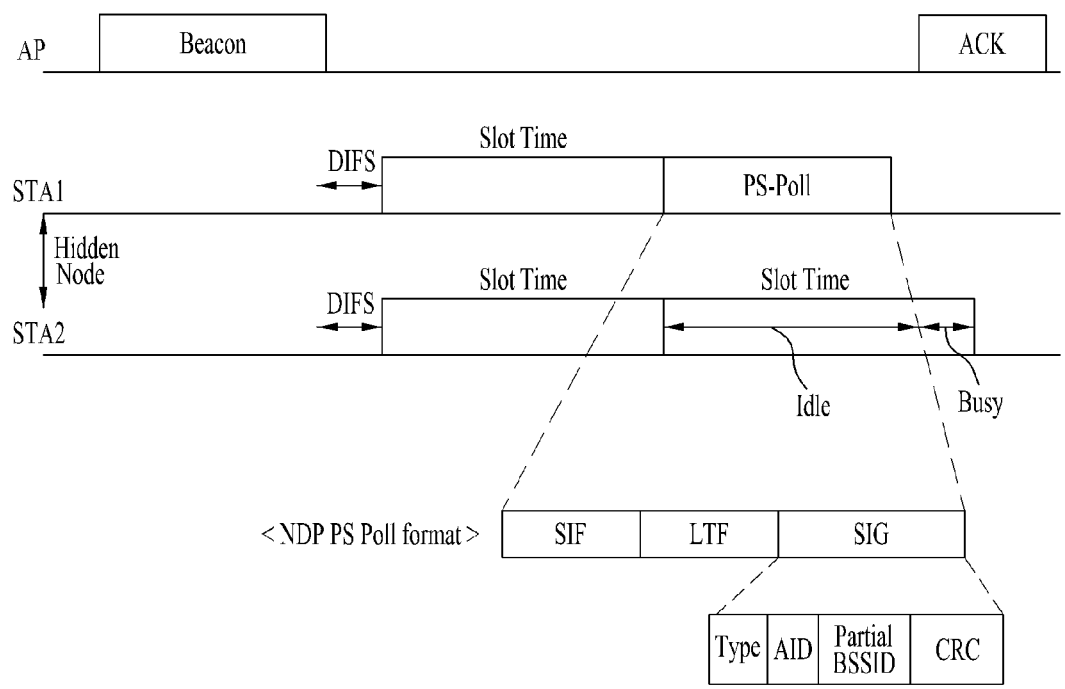
FIG. 25 illustrates an exemplary NDP PS-Poll frame.

According to the PS-Poll contention mechanism as above, the PS-Poll collision problem in the hidden node environment may be solved. However, increase of the slot time may lead to increase of time taken in the contention process. To address this problem, an NDP PS-Poll frame may be used as shown in FIG. 25. Unlike the conventional PS-Poll frame which is a MAC Control frame transmitted to the PSDU the NDP PS-Poll frame is configured only with an NDP (Null Data Packet) having no PSDU.

FIG. 25 illustrates an exemplary NDP PS-Poll frame.

Referring to FIG. 25, the NDP PS-Poll frame consists of an STF, an LTF and an SIG field. The STF and LTF fields are constructed with a channel estimation sequence, which is needed to decode the SIG field. The SIG field may include four sub-fields. In FIG. 25, the illustrated fields are simply an example of sub-fields included in the SIG field of the NDP PS-Poll format. The illustrated fields may be replaced with other sub-fields, or a another sub-field may be added. In addition, each of the sub-fields may have a different value.

The Type sub-field is for analysis of the SIG of an NPD frame and indicates that the NDP frame has been designed for the PS-Poll frame. The AID sub-field corresponds to the AID of an STA transmitting the NPD PS-Poll frame. This is intended to allow the AP having received the NDP PS-Poll frame to recognize the STA having transmitted the PS-Poll frame. The Partial BSSID sub-field corresponds to a part of the BSSID of an AP to which the STA transmitting the NDP PS-Poll frame belongs. Alternatively, a certain ID value for indentifying the AP may be used. It is also possible to define a certain ID in the AP or to use the BSSID through hashing. The SIG field includes a CRC sub-field, which is used for error detection.

If the AP receives the NDP PS-Poll frame, the AP first determines through the Partial BSSID sub-field whether the AP is an AP that should respond to the PS-Poll frame. The AP may transmit the ACK frame to the corresponding STA or transmit a buffered frame directed to the STA, in response to the NDP PS-Poll frame.

Herein, implementation of transmission of the ACK frame corresponds to absence of the buffered frame directed to the corresponding STA in the current AP or a case in which it is not possible to transmit the buffered frame to the STA immediately after the SIFS. If the buffered frame directed to the corresponding STA is not present in the AP, the More Data Bit sub-field in the Frame Control field of the ACK frame is set to 0. Otherwise, the More Data Bit sub-field in the Frame Control field of the ACK frame is set to 1.

As described above, the NDP PS-Poll frame and a new extended slot time (see Equation 12) may be used to address PS-Poll collision between existing hidden nodes. However, the stations that perform the PS-Poll by using the conventional contention-based PS-Poll scheme should receive a beacon and then continue to perform CCA until their own PS-Poll is normally transmitted, in order to recognize use of the channel by other terminals. This leads to unnecessary consumption of power by a station in performing the PS-Poll, and particularly the power consumption of a station that lastly performs the PS-Poll may be relatively large compared to the power consumption of the other stations.

Figure 26:
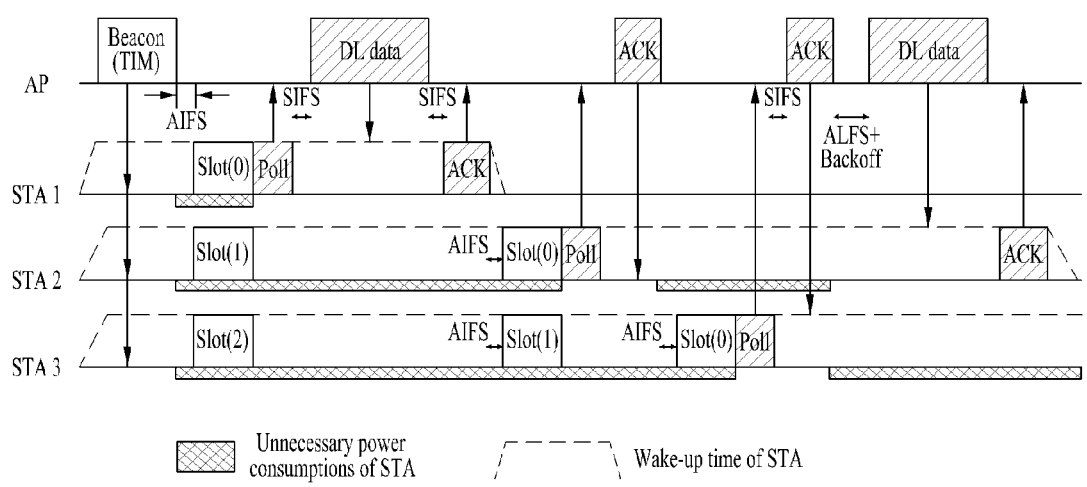
FIG. 26 illustrates an example of the channel access operation of the STA using an extended slot time.

FIG. 26 illustrates an example of the channel access operation of the STA using an extended slot time.

In FIG. 26, it is assumed that the AP has a data frame for STA 1, STA 2, and STA 3 and that STA 1, STA 2, and STA 3 have been informed of this fact through the TIM element of the beacon frame.

Referring to FIG. 26, each of STA 1, STA 2 and STA 3 attempts channel access through contention, and performs random backoff using the new extended slot time. FIG. 26 illustrates a case in which the STAs transmitting the PS-Poll select different backoff count values (e.g., STA 1=1, STA 2=2, and STA 3=3).

Hereinafter, it will be assumed that the STAs sense the busy status of the medium in an AIFS (Arbitration Inter-Frame Space) prior to PS-Poll frame transmission.

Confirming that the medium is in the idle status in the AIFS, STA 1 counts down the backoff slot (one slot) and then transmits the PS-Poll frame to the AP. At this time, STA 2 and STA 3 monitor the medium in the idle status and wait. The AP receives the PS-Poll frame from STA 1 and then transmits the data frame immediately after the SIFS, and STA 1 transmits the ACK frame in response. As described above, while STA 1 is occupying the medium, STA 2 and STA 3 stops countdown of the backoff slot and waits.

When occupancy of the medium by STA 1 is terminated, STA 2 and STA 3 confirm that the medium is in the idle status in the AIFS, and perform countdown of the residual backoff slot. Since the backoff count value of STA 2 is less than that of STA 3, STA 2 counts down the residual backoff slot (one slot), and then transmits the PS-Poll frame to the AP. At this time, STA 3 monitors the medium in the busy status and then waits. If the AP having received the PS-Poll frame from STA 2 fails to transmit the data frame immediately after the SIFS, the AP transmits the ACK frame after the SIFS. While STA 2 is occupying the medium, STA 3 stops counting down the backoff slot and waits.

When occupancy of the medium by STA 2, STA 3 confirms that the medium is in the idle status in the AIFS, performs countdown of the residual backoff slot (one slot), and then transmits the PS-Poll frame to the AP. If the AP having received the PS-Poll frame from STA 3 fails to transmit the data frame immediately after the SIFS, the AP transmits the ACK frame.

In the meantime, the AP performs contention with the STA (by confirming the idle status of the medium in the AIFS and performing random backoff) and transmits data to STA 2, and STA 2 transmits the ACK frame in response.

In the example described above, collision has not occurred since STA 1, STA 2 and STA 3 have selected different backoff count values. However, the STAs except STA1 delay PS-Poll during the channel access period thereof and continue to maintain the awake state until the data directed thereto is received, thereby resulting in unnecessary power consumption. For example, STA 2 transmits the PS-Poll, and unnecessarily maintain the awake state during the period of occupancy of the medium by STA1 and during the period of occupancy of the medium by STA3, in order to receive data directed thereto. In addition, since the slot time has been significantly extended compared to the PS-Poll transmission time in this case, unnecessary power consumption may significantly increase over the conventional cased.

Figure 27:
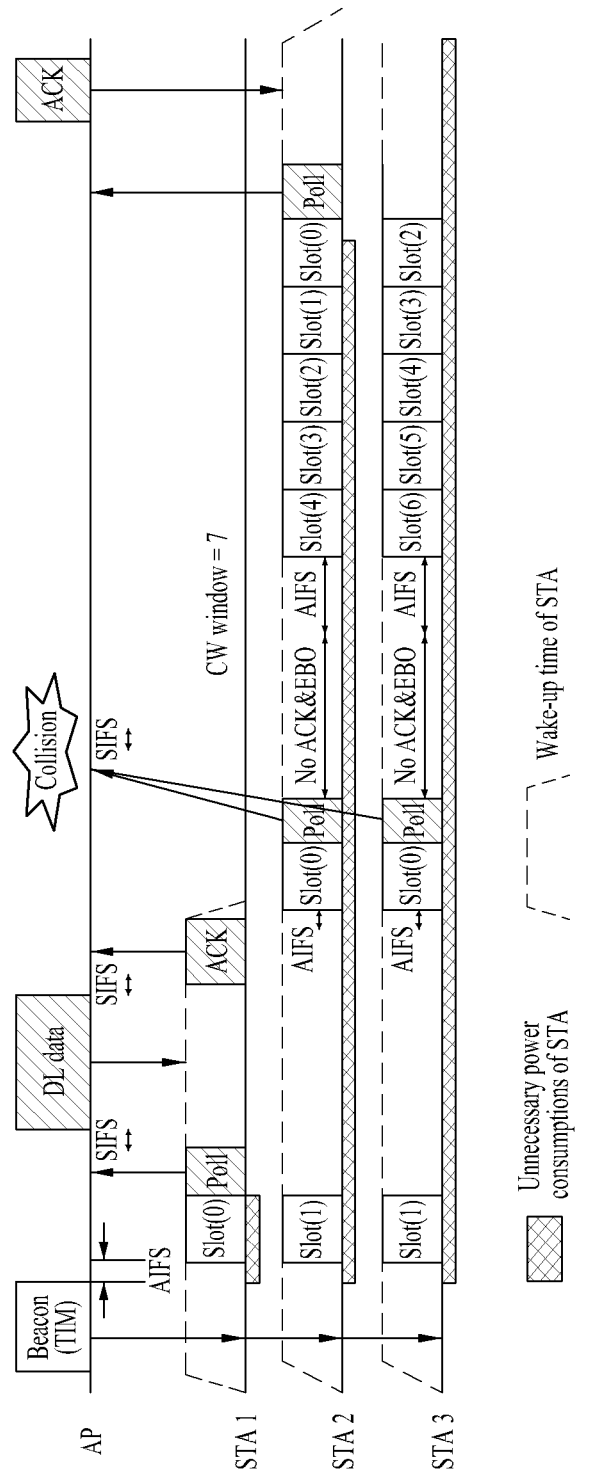
FIG. 27 illustrates another example of the channel access operation of the STA using an extended slot time.

FIG. 27 illustrates another example of the channel access operation of the STA using an extended slot time.

In FIG. 27, it is assumed that the AP has a data frame for STA 1, STA 2, and STA 3 and that STA 1, STA 2, and STA 3 have been informed of this fact through the TIM element of the beacon frame.

Referring to FIG. 27, each of STA 1, STA 2 and STA 3 attempts channel access through contention, and performs random backoff using the new extended slot time. FIG. 26 illustrates a case in which STA 2 and STA 3 select the same backoff count value (e.g., STA 1=1, STA 2=2, and STA 3=2).

As in the case of FIG. 26, when occupancy of the medium by STA 1 is terminated, STA 2 and STA 3 confirm that the medium is in the idle status in the AIFS, and perform countdown of the residual backoff slot. Since STA 2 and STA 3 have the same backoff count value, collision occurs. If collision occurs as in this case, both STA 2 and STA 3 fail to receive the ACK frame or data frame from the AP, and thus data transmission is failed. In this case, STA 2 and STA 3 performs exponential backoff. That is, they double the CW value, and then re-select the backoff count value. In the example of FIG. 27, STA 2 and STA 3 select 5 and 7 as the backoff count value. Since STA 2 has a smaller backoff count value than STA 3, it performs countdown of the backoff slot (five slots) and then transmits the PS-Poll to the AP.

As two STAs have the same backoff count value and thus collision occurs, power consumption of the two STAs increases, and transmission delay also increases. In addition, since the slot time has been significantly extended compared to the PS-Poll transmission time, unnecessary power consumption may significantly increase over the conventions cases.

Improved Channel Access Scheme

To solve the aforementioned problem, the present invention proposes a method for reducing unnecessary power consumption that may occur when STAs perform the PS-Poll after receiving a beacon including the TIM and recognizing data to be transmitted thereto. to this end, in the improved channel access method, the channel access operation may be performed in the channel access intervals set for specific STAs. In the following description of the present invention, a PS-Poll operation (an improved scheduled PS-Polling scheme) will be assumed to be performed for channel access. However, embodiments of the present invention are not limited thereto. a frame for new channel access may also be applied.

In the present invention, the aforementioned new extended slot time may be used in performing the random backoff of an STA. However, embodiments of the present invention are not limited thereto, and the contention slot time may also be used. If the extended slot time is used, it may be determined as in Equation 12. In addition, an NDP PS-Poll frame having STF, LTF and SIG fields may be used for PS-Poll, but embodiments of the present invention are not limited thereto. The conventional MAC Control frame may also be used.

In addition, for an ACK frame, the conventional ACK frame may be used, or an NDP ACK frame having only STF, LTF, SIG fields, similar to the aforementioned NDP PS-Poll frame, may be used. In this case, the size of the NDP PS-Poll frame may be equal to that of the NDP ACK frame.

Hereinafter, an STA may sense the busy or idle status of the medium during one of SIFS, PIFS, PIFS+additional time, and EDCA time (AIFS+random backoff) prior to PS-Poll frame transmission. That is, the STA senses a channel by selecting one of the SIFS, PIFS, PIFS+additional time, and EDCA time, and then transmits the PS-Poll if the channel is idle. Herein, EDCA time refers to the channel sensing time used by a conventional STA when the conventional STA accesses the channel based on EDCA. Hereinafter, for simplicity of description, it will be assumed that the STA uses the PIFS.

Figure 28:
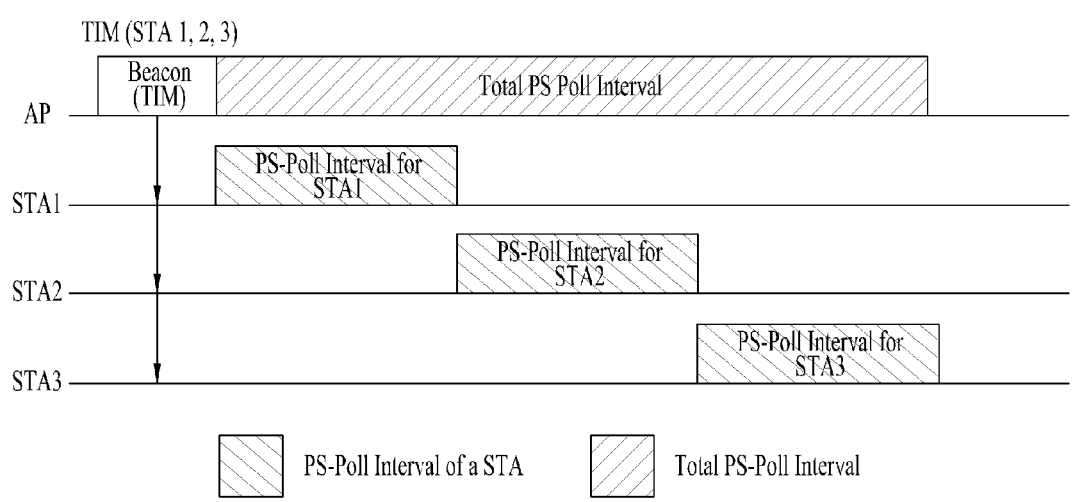
FIG. 28 exemplarily illustrates PS-Poll intervals set for each STA according to one embodiment of the present invention.

FIG. 28 exemplarily illustrates PS-Poll intervals set for each STA according to one embodiment of the present invention.

In FIG. 28, it is assumed that the AP has a data frame for STA 1, STA 2, and STA 3 and that STA 1, STA 2, and STA 3 have been informed of this fact through the TIM element of the beacon frame.

Referring to FIG. 28, the PS-Poll intervals for the STAs have been specified for the respective STAs based on the TIM information element included in the beacon, and the PS-Poll intervals for the STAs performing PS-Poll are set at different positions. That is, if the AP stores a data frame to be transmitted to STAs, the AP may set PS-Poll intervals for the STA (STA 1, STA 2, and STA 3) respectively. In addition, in order to prevent the STAs (STAs other than STA 1, STA 2 and STA 3) which are not indicated by the TIM element from attempting channel access within the total PS-Poll interval, the AP may set the value of the Duration field in the MAC header of the beacon by adding the total PS-Poll interval to the length of the beacon. Since the STAs can confirm the length of the beacon through the Length field and MCS field in the SIG field, the total PS-Poll interval specified for the STAs (STA 1, STA 2, STA 3) indicated by the TIM element may be known through the Duration field, and the other STAs (the STAs other than STA 1, STA 2 and STA 3) which are not indicated by the TIM element may not attempt channel access in the total PS-Poll interval.

The AP may explicitly inform the STAs of the information about the positions of the PS-Poll intervals through an information element (e.g., a TIM information element or a Polling allocation information element) of the beacon frame. That is, the AP may additionally inform each of the STAs indicated by the TIM element of the position information about the PS-Poll interval for the corresponding STA through an information element in the beacon frame. For example, the AP may inform each of the STAs of the offset information about the start time of the PS-Poll interval and the length information about the PS-Poll interval of the corresponding STA. At this time, the length information about the PS-Poll interval may be different among the STAs. If all the STAs use the same PS-Poll interval length, only one PS-Poll interval length information item is included in the information element of the beacon frame, and each of the involved STAs acquires its own PS-Poll interval information using the corresponding PS-Poll interval length. If the length of the PS-Poll interval for each of STAs is fixed or implicitly recognizable by the corresponding STA (e.g., the PS-Poll interval length set by the system is PIFS+PS-Poll frame transmission time+SIFS+CCA Time of Response frame (e.g., ACK frame transmission time)+2*Air Propagation Delay), the AP may inform each of the STAs of information about the start time of the total PS-Poll interval and information about the order of PS-Polls of the STAs indicated through the TIM through the TIM element. In this case, each STA may checks the position of the PS-Poll interval thereof in order with respect to the start time of the total PS-Poll interval using the PS-Poll order information, thereby recognizing the position of the PS-Poll interval thereof. If the length of the PS-Poll interval for each of STAs is fixed or implicitly recognizable by the corresponding STA, and the start time of the total PS-Poll interval is fixed (e.g., if the total PS-Poll interval immediately begins at the specified time after the beacon is received), the AP may only inform of the PS-Poll order information about the STAs indicated by the TIM through the TIM element.

Alternatively, each STA may implicitly recognize the position information about the PS-Poll interval thereof through the TIM element. For example, when it is assumed that STA 1, STA 2 and STA 3 are sequentially indicated by the Partial Virtual Bitmap field of the TIM element and that the PS-Poll order has the ascending order of the bitmap, STA 1, STA 2 and STA 3 may have their own PS-Poll intervals in this order. The order of PS-Polls of the respective STAs may be preset, by the system, to the ascending order or descending order according to the order of the bitmap as described above, or may be calculated by the STAs based on the predetermined specific permutation, using the bitmap order.

As described above, each STA may recognize the position of the PS-Poll interval thereof and the PS-Poll intervals of the other STAs based on the information contained in the TIM. The STA having checked the position of the PS-Poll interval thereof may perform the PS-Poll operation. In addition, the STA may check, at the start time of the PS-Poll interval thereof, whether the medium is busy in the PIFS, and then transmits PS-Poll to the AP if the medium is in the idle status. If the channel is busy in the PIFS at the start time of the PS-Poll interval, the STA may delay PS-Poll frame transmission within the PS-Poll interval thereof. Thereafter, if it is confirmed that the medium is in the idle status in the PIFS, the STA may transmit the delayed PS-Poll frame to the AP. At this time, the other STAs may operate in the sleep state since the PS-Poll interval is not their own PS-Poll interval.

If the AP receives a PS-Poll frame from the STA in the PS-Poll interval of the STA, the AP transmits the ACK frame to the STA after the SIFS. If the PS-Poll frame is not correctly received from the STA within the PS-Poll interval, the AP may transmit a frame including NACK or an ACK frame to the STA. Herein, NACK or the ACK frame may include an NDP frame.

Hereinafter, for simplicity of description, it will be assumed that the STA is capable of implicitly recognizing the position of the PS-Poll interval thereof through the TIM element.

If the first PS-Poll interval begins right after reception of the beacon within a corresponding beacon period, the PS-Poll interval of one STA may be determined by Equation 13 given below.

PS-Pollinterval=SIFS(or PIFS)+PS-Polltransmissiontime+ SIFS+ACKtransmissiontime+2*AirPropagation- Delay     Equation 13

Alternatively, if If the first PS-Poll interval begins when SIFS or PIFS elapses after reception of the beacon within the corresponding beacon period, the PS-Poll interval of one STA may be determined by Equation 14 given below.

PS-Pollinterval=PS-Polltransmissiontime+SIFS+ ACKtransmissiontime+SIFS(or PIFS)+2* AirPropagationDelay     Equation 14

If the NDP PS-Poll frame and the NDP ACK frame are used, the PS-Poll interval of one STA may be determined by Equation 15 given below.

2*NDPframetransmissiontime+SIFS(or PIFS)+SIFS+ 2*AirPropagationDelay     Equation 15

The total PS-Poll interval may be determined by Equation 16 given below.

(SIFS(or PIFS)+PS-Polltransmissiontime+SIFS+ ACKtime)*$N$+2*AirPropagationDelay*$N$ or (2*NDPframetransmissiontime+SIFS(or PIFS)+ SIFS)*$N$+2*AirPropagationDelay*$N$     Equation 16

In Equation 16, N denotes the total number of STAs set to 1 in the TIM bitmap, i.e., the total number of STAs to perform PS-Poll.

Hereinafter, for simplicity of description, it will be assumed that the PS-Poll interval of one STA is determined by Equation 13 as given above.

Thereafter, each of the STAs having performed PS-Poll in the PS-Poll interval thereof switches to the awake state after the total PS-Poll interval in order to receive data from the AP.

Figure 29:
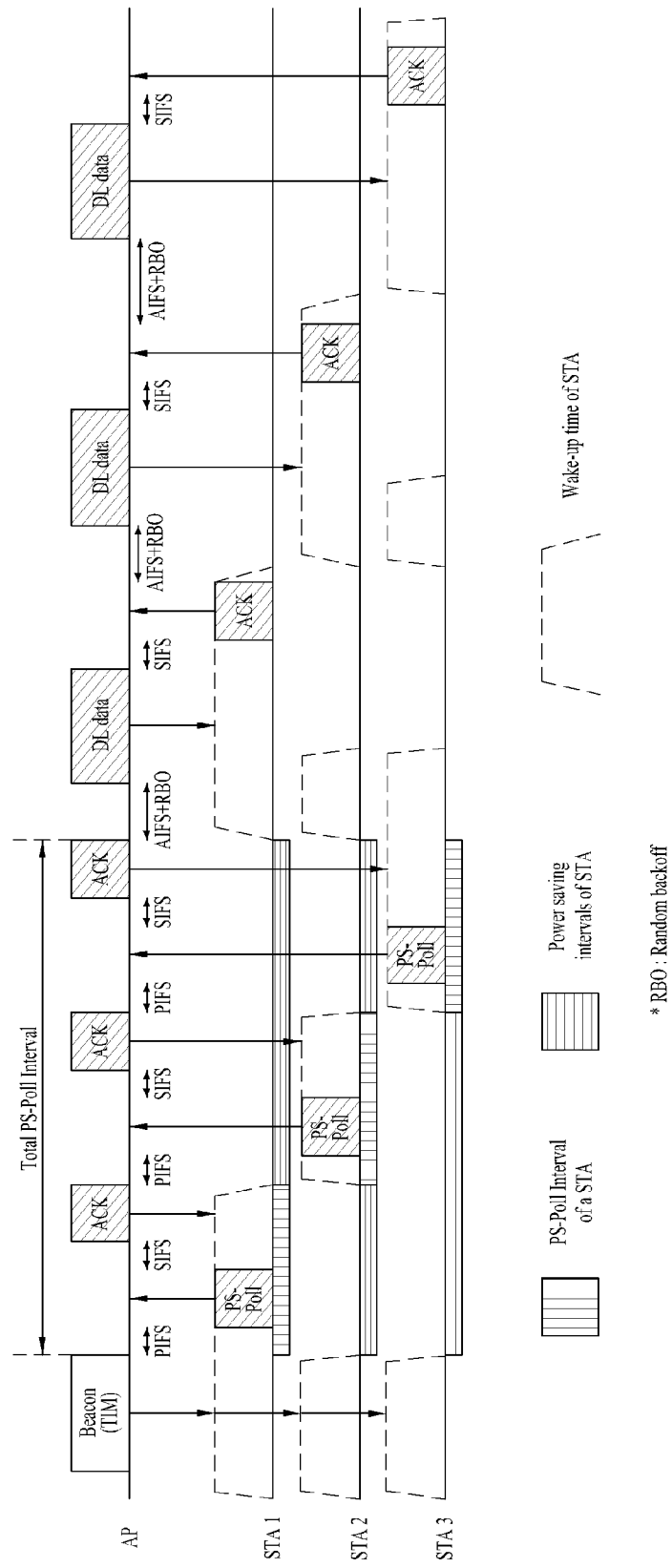
FIGS. 29 to 34 exemplarily illustrate the channel access operation of an STA according to one embodiment of the present invention.

FIG. 29 illustrates the channel access operation of an STA according to one embodiment of the present invention.

In FIG. 29, it is assumed that the AP has a data frame for STA 1, STA 2, and STA 3 and that STA 1, STA 2, and STA 3 have been informed of this fact through the TIM element of the beacon frame.

Referring to FIG. 29, if the three STAs (STA 1, STA 2 and STA 3) are sequentially indicated by the TIM of the beacon, the PS-Poll intervals may be established for the STAs in the order of STA1, STA2 and STA3, and each of the STAs may recognize the position of the PS-Poll interval thereof based on the information contained in the TIM.

First, the PS-Poll interval of STA 1 begins after reception of the beacon. If STA1, which is the first STA, confirms, after reception of the beacon, that the medium is in the idle status in the PIFS, STA1 transmits the PS-Poll frame to the AP. Since each STA is capable of recognizing the PS-Poll interval thereof, the STAs other that the STA performing the first PS-Poll may switch to the sleep state after receiving the beacon and maintain the sleep state until the PS-Poll intervals thereof reach. In FIG. 29, STA 2 and STA 3 switch to the sleep state after receiving the beacon, and maintain the sleep state until the PS-Poll intervals thereof reach. The AP receives the PS-Poll frame from STA 1 and transmits the ACK frame after SIFS, and then the PS-Poll interval of STA 1 ends. Each of the STAs other than the STA (STA 3) performing the last PS-Poll may switch to the sleep state at the end time of the PS-Poll interval thereof and maintain the sleep state until the time when the total PS-Poll interval ends. In FIG. 29, STA 1 switches to the sleep state at the end time of the PS-Poll interval thereof and maintains the sleep state until the end time of the total PS-Poll interval.

The PS-Poll interval of STA 2 begins after the PS-Poll interval of STA 1 (after the ACK frame transmission time for STA 1). When STA 2 switches to the awake state and confirms that the medium is in the idle status in the PIFS, STA 2 transmits the PS-Poll frame to the AP. The AP receives the PS-Poll frame from STA 2 and transmits ACK frame after the SIFS, and then the PS-Poll interval ends. As in the case of STA 1, STA 2 switches to the sleep state at the end time of the PS-Poll interval thereof and maintains the sleep state until the time at which the total PS-Poll interval ends.

The PS-Poll interval of STA 3 begins after the PS-Poll interval of STA 2 (after the ACK frame transmission time for STA 2). When STA 3 switches to the awake state and confirms that the medium is in the idle status in the PIFS, STA 3 transmits the PS-Poll frame to the AP. The AP receives the PS-Poll frame from STA 2 and transmits ACK frame after the SIFS. Since STA3 is the last STA (i.e., the end time of the PS-Poll interval of STA 3 coincides with the time at which the total PS-Poll interval ends), STA 3 does not switch to the sleep state, but maintains the awake state.

After the total PS-Poll interval ends, the AP transmits data to each of the STAs, and the STAs (except the last STA) switch to the awake state at the time the total PS-Poll interval ends and performs CCA to receive data from the AP. The last STA (STA 3) maintains the awake state from the PS-Poll interval thereof and performs CCA. The AP may perform contention based on the random backoff period and then transmit data to the STAs. In other words, the AP may select a backoff count value for each of the STAs, and transmits data to the STAs in order from the STA having the smallest backoff count value first and to the STA having the greatest backoff count value. In the example shown in FIG. 29, STA 1 has the smallest backoff count value, and STA 2 has the nest smallest backoff count value, and STA 3 has the greatest backoff count value. The AP confirms that the medium is in the idle status in the AIFS, and transmits a data frame to STA 1 after counting down the backoff slot. An STA may check, through the preamble (e.g., Partial AID of the SIG field) of the data frame transmitted from the AP, whether the data frame is directed thereto. That is, STA 1 confirms that the data frame is directed thereto and decodes the data frame, while the other STAs (STA 2 and STA 3) confirms that the data frame is not directed thereto and switches to the sleep mode. In addition, the STAs may recognize the length of the MPDU of the data frame through the preamble (e.g., Length of the SIG field) of the data frame transmitted from the AP. That is, the STAs having switched to the sleep mode confirming that the data frame is not directed thereto may switch back to the active state in consideration of the MPDU length of the other STA.

STA 1, having received the data frame from the AP, transmits the ACK frame to the AP after the SIFS. At the time STA 1 transmits the ACK frame to the AP, i.e., the time when transmission of dat to the STA1 by the AP is terminated, STA 2 and STA 3 switch from the sleep state to the awake state, and then receive a data frame from the AP based on contention.

Meanwhile, the AP may transmit data frames to the STAs based on non-contention. For example, the AP may transmit scheduling information to each of the STAs within the PS-Poll interval of the corresponding STA. In this case, the STA may receive the ACK frame for the PS-Poll frame from the AP within the PS-Poll interval thereof, wait for scheduling information for downlink data transmission from the AP when the total PS-Poll interval ends, and receive data using the acquired scheduling information. When the STA acquires the scheduling information from the AP as above, the STA may switch to and remain in the sleep state until the start time of downlink data transmission, thereby minimizing power consumption.

In addition, the AP may transmit data to the STA performing the last PS-Poll without transmission of the ACK frame for the PS-Poll, which will be described with reference to FIG. 30.

Figure 30:
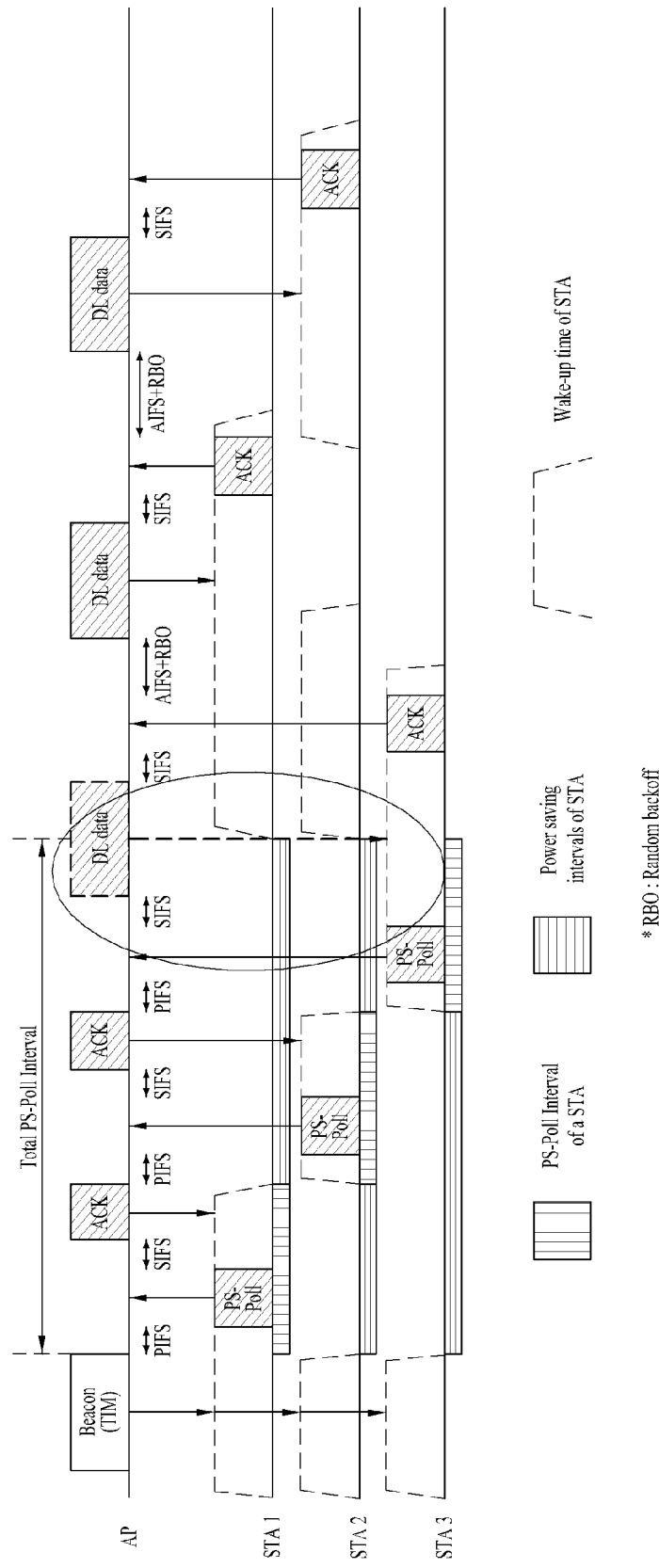

FIG. 30 illustrates the channel access operation of an STA according to one embodiment of the present invention.

In the example of FIG. 30, each of the STAs transmits the PS-Poll frame to the AP in the PS-Poll interval thereof, as in the example of FIG. 29.

Referring to FIG. 30, if the AP having received the PS-Poll frame from STA 3, which is the last STA, confirms that STA 3 is the last STA, the AP does not transmit the ACK frame for the PS-Poll frame, but transmits a data frame to the STA 3 after elapse of the SIFS.

After the total PS-Poll interval ends, the AP may transmit data to the STAs other than the last STA (STA 3), and the STAs except the last STA may switch to the awake state at the time the total PS-Poll interval ends. In this case, since STA 1 and STA 2 has switched to awake state during transmission of a data frame to STA 3 (i.e., at the time the total PS-Poll interval ends), STA 1 and STA 2 cannot check the preamble of the data frame transmitted to STA 3. Accordingly, STA 1 and STA 2 maintain the awake state, and confirms thereafter, through the preamble of the data frame transmitted from the AP, that the data frame is directed to STA 1. Thereafter, STA 1 may decode the data frame, and STA 2 may switch back to the sleep state.

In the example of FIG. 30, STA 1 and STA 2 switch to the awake state at the time at which the total PS-Poll interval ends, and maintains the awake state until they receive a data frame from the AP. Alternatively, if the STAs other than the last STA confirm that the medium is in the busy status after switching to the awake state at the time when the total PS-Poll interval ends, they may switch to the sleep state, then switch back to the awake state at the time occupancy of the medium ends to confirm whether a data frame is transmitted thereto.

The AP may perform contention based on the random backoff period, and then transmit data to the STAs except the last STA. The operation of the AP transmitting data to the STAs other than the last STA is identical to that of the previous example of FIG. 29, and thus it will not be described below.

The AP may transmit a data frame to an STA having a delay sensitive packet directed thereto first after the total PS-Poll interval elapses, which will be described with reference to FIG. 31.

FIG. 30 illustrates the channel access operation of an STA according to one embodiment of the present invention.

Figure 31:
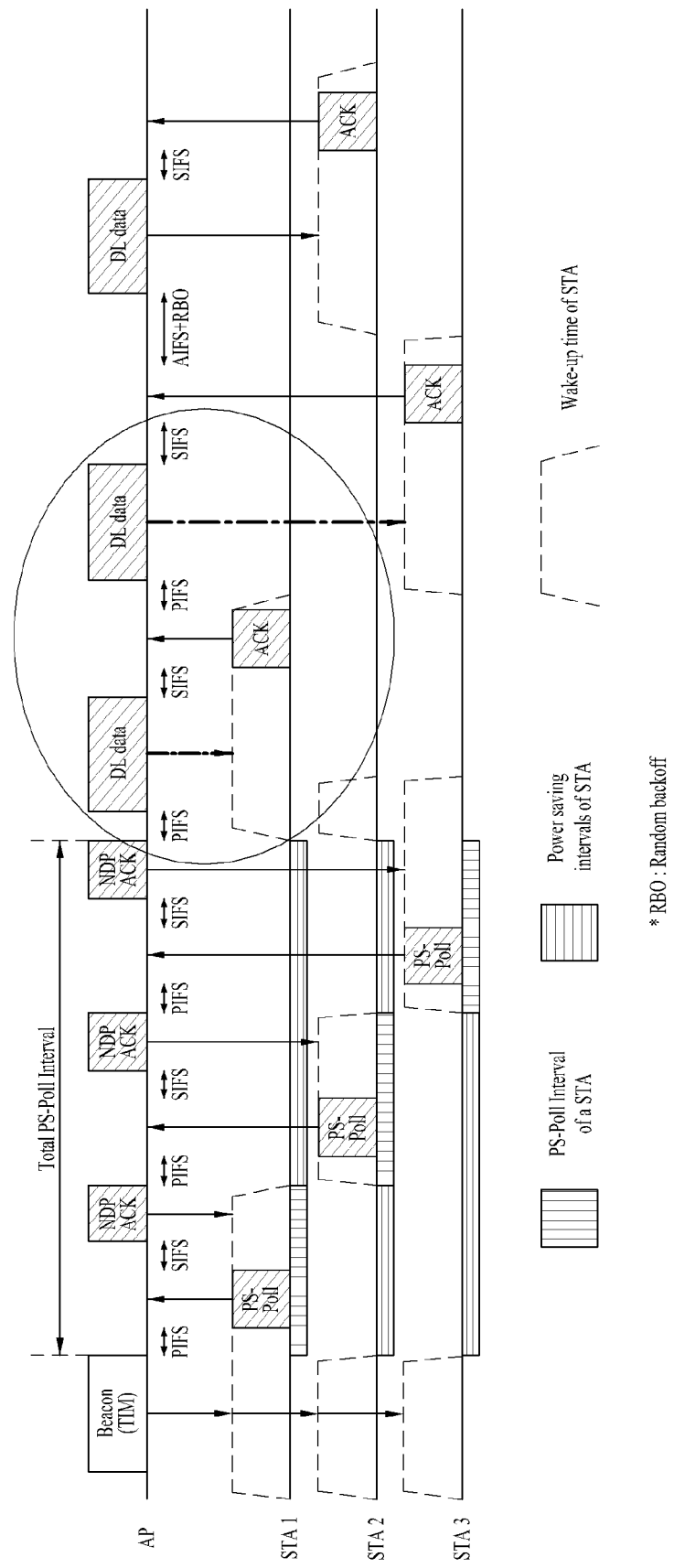

In the example of FIG. 31, each of the STAs transmits the PS-Poll frame to the AP in the PS-Poll interval thereof, as in the example of FIG. 29.

Referring to FIG. 31, after the total PS-Poll interval elapses, the AP may wait in the PIFS (or SIFS) and then transmit, without the random backoff procedure, a delay sensitive data frame to an STA to which the corresponding data frame is directed among the polled STA. That is, the AP may transmit data without performing contention. Thereby, delay in transmission of a delay sensitive packet according to the data transmission operation, which has a long slot time and is based on the random backoff may be prevented. In this case, data transmission to the STAs having no delay sensitive packet may be performed still based on contention, as in the example of FIG. 29 or 30. Herein, the end time of the total PS-Poll interval may be the time at which a response is transmitted to an STA having performed PS-Poll for the last time. For example, in the case of the example of FIG. 29, the end time may indicate the time at which the (NDP) ACK frame is transmitted to an STA having performed PS-Poll for the last time. In the case of the example of FIG. 30, the end time may indicate the time at which the data frame is transmitted to an STA having performed the last PS-Poll. In the example of FIG. 31, the end time of the total PS-Poll interval is the time at which the (NDP) ACK frame is transmitted to STA 3 having performed the last PS-Poll, and the AP transmits a downlink data frame for STA 1 and STA 3 immediately after the PIFS subsequent to the total PS-Poll interval. Since STA 2 does not have a delay sensitive packet, transmission of data to STA 2 is performed based on contention (AIFS+random backoff) as in the example of FIG. 29 or 30.

In the meantime, there may be a case in which not all the STAs addressed to the TIM receive the TIM. For example, interference may be caused by an overlapping BSS (OBSS) or an STA may miss the TIM. In this case, the STA having failed to receive the TIM cannot transmit the PS-Poll frame within the PS-Poll interval thereof. In addition, there may be a case in which the STA has normally transmitted the PS-Poll frame but the AP fails to receive the PS-Poll frame. Operation between the AP and the STA in this case will be described with reference to FIG. 32.

Figure 32:
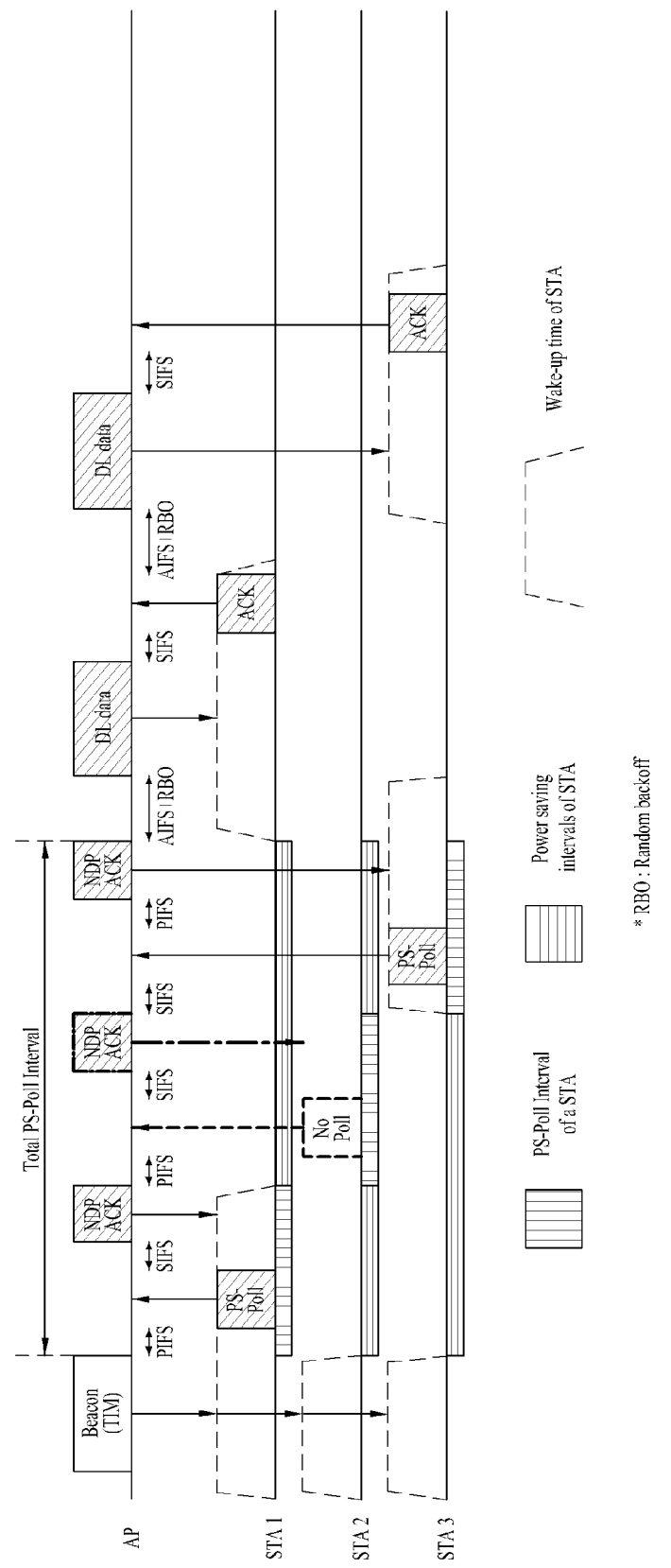

FIG. 32 illustrates the channel access operation of an STA according to one embodiment of the present invention.

In the example of FIG. 32, each of the STAs transmits the PS-Poll frame to the AP in the PS-Poll interval thereof, as in the example of FIG. 29.

FIG. 32 illustrates a case in which the AP fails to receive the PS-Poll frame from STA 2. If the AP does not receive PS-Poll from an STA in the determined PS-Poll interval of the STA for the PS-Poll transmission time, the AP transmits an unsolicited NDP frame to the STA after elapse of SIFS. When it is assumed that the STA has normally transmitted the PS-Poll, the time at which the unsolicited NDP frame is transmitted may be identical to the time (PIFS+PS-Poll transmission time+SIFS) at which the (NDP) ACK frame is transmitted. Herein, the unsolicited NDP frame may take the form of the (NDP) ACK frame, used in the examples of FIGS. 29 to 31, or a new NDP frame, or a new MAC frame. In addition, the unsolicited NDP frame may include ACK, NACK or a non-Polling indication. By transmitting the NDP frame (or a new frame), intervention of other STAs (e.g., a hidden node) in the PS-Poll interval may be prevented even if the AP fails to receive the PS-Poll frame from a determined STA at the determined time.

An STA having received an NDP frame including ACK, NACK or a non-Polling indication may perform PS-Poll based on contention. In this case, the STA may use an extended slot time. Although not shown in FIG. 32, the medium is occupied by the STA (e.g., STA 1, STA 3) in the PS-Poll interval set for the STA, and if there is another STA having failed to receive the TIM in the PS-Poll interval thereof, the AP transmits an NDP frame including NACK or a non-Polling indication. Accordingly, the STA having received the NDP frame including NACK or the non-Polling indication may perform PS-Poll based on contention after the total PS-Poll interval.

As such, in the case in which the slot time is set to the extended slot time according to Equation 12 given above, intervention of other STAs in the PS-Poll interval may be prevented by transmitting the NDP frame as in the example of FIG. 32. However, if the slot time does not have the extended slot time, the example of FIG. 32 may not be applicable. For example, if the slot time is identical to the PS-Poll frame time, and intervention of other STAs occurs during the period of time (PIFS+PS-Poll transmission time+SIFS), the intervention may not be prevented through the example of FIG. 32. Even in this case, however, while the STA indicated through the TIM element of the beacon frame performs PS-Poll using the PS-Poll interval thereof, the STAs which are not indicated through the TIM element may recognize the total PS-Poll interval through the bitmap number of the TIM element or the value of the Duration field of the MAC header of the beacon, and accordingly may not attempt channel access in the total PS-Poll interval. Thereby, the aforementioned problem may not occur.

Meanwhile, when the STA having received the TIM attempts to perform PS-Poll in the assigned PS-Poll interval, the channel may be in the busy status, which will be described with reference to FIG. 33.

Figure 33:
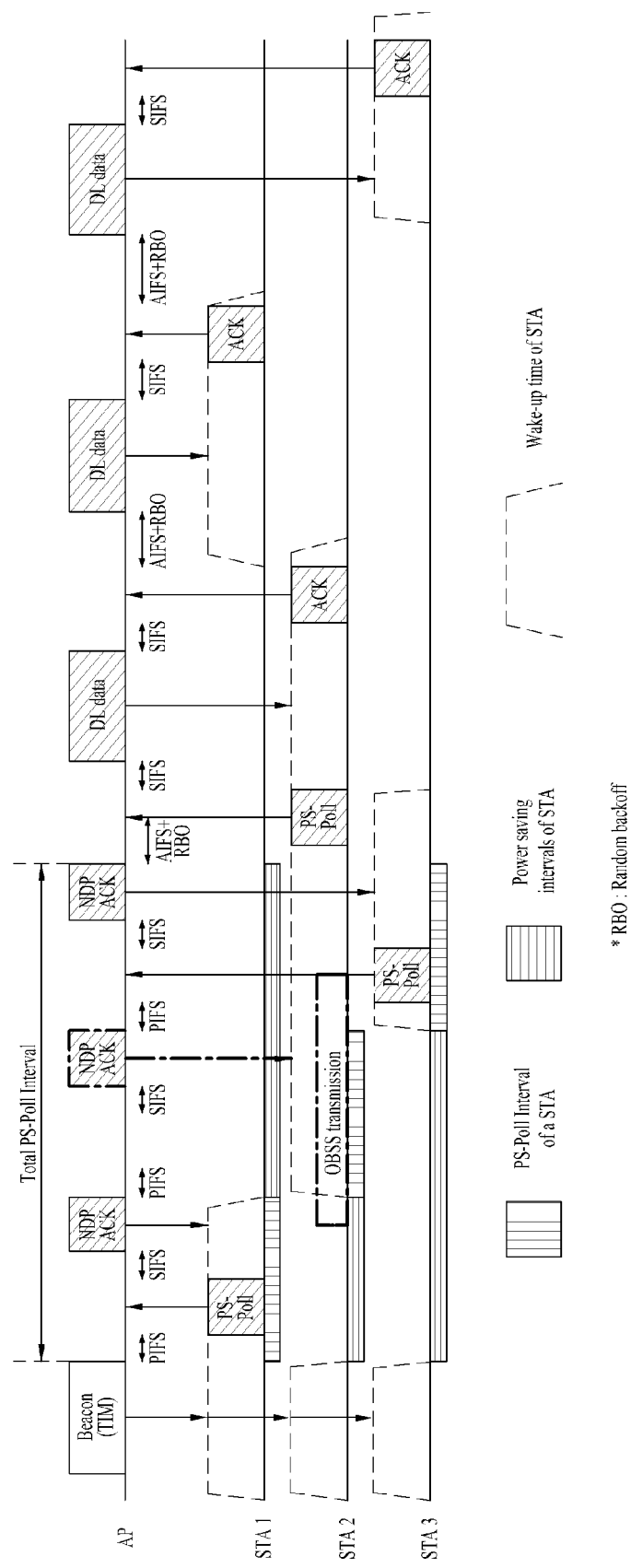

FIG. 33 illustrates the channel access operation of an STA according to one embodiment of the present invention.

In the example of FIG. 33, each of the STAs transmits the PS-Poll frame to the AP in the PS-Poll interval thereof, as in the example of FIG. 29.

Referring to FIG. 33, when the STA having received the TIM attempts to perform PS-Poll in the PS-Poll interval assigned thereto, the channel may be in the busy status. In the case of FIG. 33, when STA 2 attempts PS-Poll, the channel is occupied by transmission of the overlapping BSS (OBSS). In this case, if it is determined that the channel is occupied (due to OBSS transmission) when STA2 attempts to perform PS-Poll in the PS-Poll interval thereof, STA 2 delays PS-Poll transmission until the channel is switched to the idle status. If the channel is idle in the AIFS, STA 2 attempts PS-Poll transmission again. That is, the corresponding STA does not transmit the PS-Poll frame in the PS-Poll interval assigned thereto, but uses the extended slot time to attempt PS-Poll transmission on the conventional contention basis (AIFS+random backoff). That is, since a PS-Poll interval has been assigned to each of the polled STAs within the total PS-Poll interval as in the example o FIG. 32, the corresponding STA may perform PS-Poll on the contention basis after elapse of the total PS-Poll interval.

Meanwhile, the AP may transmit STF in place of the (NDP) ACK frame used in the examples of FIGS. 29 to 33. Since STF is used in place of the (NDP) ACK frame, the (NDP) ACK frame may be transmitted after the total PS-Poll interval.

In this case, the PS-Poll interval of each of the STAs may be determined by Equation 17 given below.

PS-PollInterval=PIFS(or SIFS)+PS-Polltransmission+ SIFS+STF+2*AirPropagationDelay        Equation 17

The AP transmits STF in the PS-Poll interval of each of the STA at the assigned time (after the time of PIFS/SIFS+ PS-Poll transmission time+SIFS) in place of the (NDP) ACK frame. The STF transmitted by the AP may function to inform the other STAs that the channel is occupied by the assigned STA in the assigned PS-Poll interval, thereby prohibiting intervention of a hidden node STA. In addition, the STF has a smaller size than the conventional ACK frame or the NDP frame, and thus the size of the total PS-Poll interval may be reduced. Thereby, power consumption of the STA may be reduced.

The total PS-Poll interval may be determined by Equation 18 given below.

TotalPSPollInterval=(PIFS(or SIFS)+PS-Polltransmissiontime+SIFS+STFtime)* N+2*AirPropagationDelay*N        Equation 18

In Equation 18, N denotes the total number of STAs set to 1 in the TIM bitmap, i.e., the total number of STAs to perform PS-Poll.

If the PS-Poll frame includes an NDP frame, the total PS-Poll interval may be determined by Equation 19 given below.

Equation 19

Figure 34:
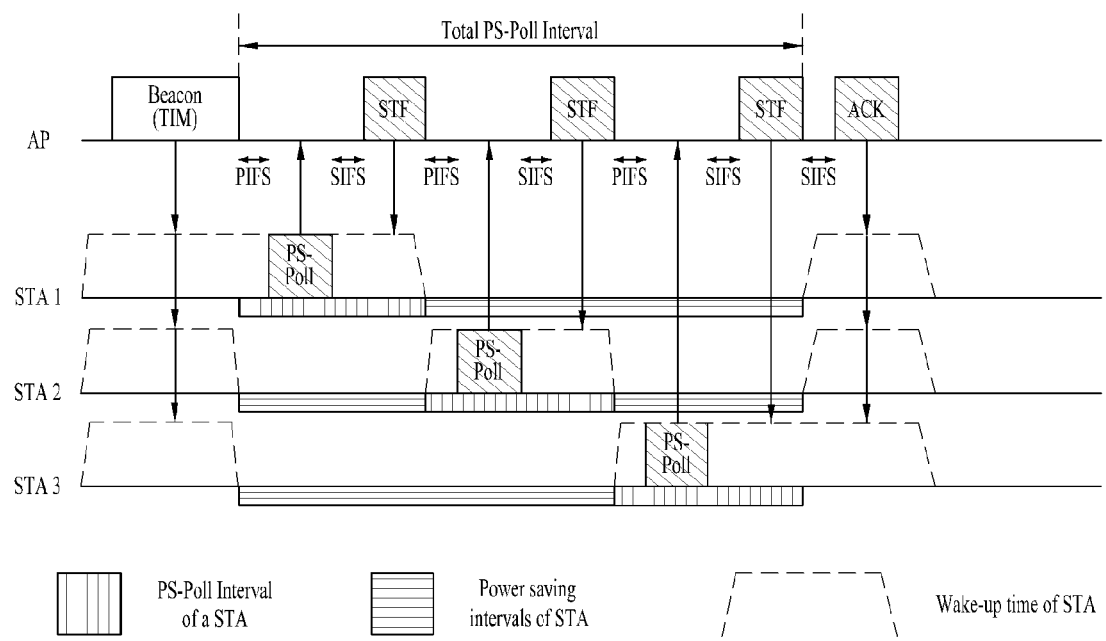

FIG. 34 illustrates the channel access operation of an STA according to one embodiment of the present invention.

In the example of FIG. 34, each of the STAs transmits the PS-Poll frame to the AP in the PS-Poll interval thereof, as in the example of FIG. 29, and the AP transmits STF in place of (NDP) ACK frame, in response to the PS-Poll frame.

Referring to FIG. 34, the AP transmits the ACK frame to all STAs after the total PS-Poll interval, and each of the STA (except the last STA) switches to the awake state at the time at which the total PS-Poll interval ends, and performs CCA to receive the ACK frame from the AP. The last STA (STA 3) maintains the awake state from the PS-Poll interval thereof and performs CCA. If the AP receives the PS-Poll frame from all the STAS indicated by the TIM, the AP may broadcast-transmit one ACK frame. At this time, the ACK frame may be transmitted in the form of the conventional ACK frame or in the form of the NDP ACK frame. However, the AP does not receive the PS-Poll frame from all the STAS indicated by the TIM, the AP may transmit the ACK to each STA or broadcast-transmit a group ACK frame including bitmap information indicating ACK to each of the STAs. Hereinafter, this group ACK frame will be referred to as PS-Poll Group ACK (PPGA) frame.

Although not shown in FIG. 34, after the AP transmits the ACK frame to all the STAs, the AP transmits data to each of the STAs, and each of the STAs performs CCA to receive the data from the AP. The AP may perform contention based on the random backoff period to transmit the data to each of the STAs. The process of reception of the data from the AP may be conducted in the same manner as in the example of FIG. 29.

Hereinafter, the NDP ACK frame and the PPGA frame will be described in detail.

Figure 35:
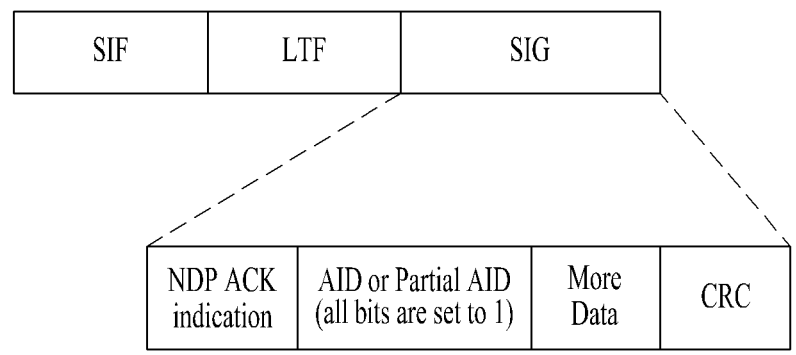
FIG. 35 exemplarily illustrates an NDP ACK frame according to one embodiment of the present invention.

FIG. 35 exemplarily illustrates an NDP ACK frame according to one embodiment of the present invention.

Referring to FIGS. 34 and 35, the NDP ACK frame may include STF, LTF, and SIG field. The SIG field may include an NDP ACK indication sub-field, an AID or Partial AID sub-field, a More Data sub-field, and a CRC sub-field. Herein, the sub-fields, which correspond to examples of sub-fields that may be included in the NDP ACK frame, may be replaced with other sub-fields, or an additional sub-field may be further included.

The NDP ACK indication sub-field indicates that a corresponding frame is the NDP ACK frame. Through the NDP ACK indication sub-field, the STA may be informed that the frame is ACK for the PS-Poll. The AID (or Partial AID) sub-field indicates the STA that receives the corresponding NDP ACK frame. The More Data sub-field indicates, toward the AP, presence or absence of a buffered frame directed to the STA that received the corresponding NDP ACK frame. The CRC sub-field is used for error detection for the SIG field.

If the AP receives the PS-Poll frame from all the STAs indicated by the TIM as in the example of FIG. 34, the AID (or Partial AID) sub-field may be set to a specific value (e.g., all bits set to 1 or 0) indicating multicast/broadcast to allow the STAs having transmitted PS-Poll to receive the NDP ACK frame (i.e., in order to indicate that ACK is broadcast-transmitted). If the STA having received the NDP ACK frame including the AID (or Partial AID) sub-field set to the specific value is the STA that has performed the PS-Poll, the STA may confirm if the frame is the group ACK for the PS-Poll. That is, if the AID indicates all the STAs having performed PS-Poll when the STA receives the NDP ACK frame, the STAs having performed PS-Poll determines that ACK has been transmitted thereto, and read the SIG field. On the other hand, the STAs that have not performed PS-Poll may ignore the NDP ACK frame.

Unlike the example of FIG. 34, if the AP fails to receive the PS-Poll frame from all the STAs indicated through the TIM, it may transmit the NDP ACK frame to each of the STAs having transmitted the PS-Poll frame. In this case, the AID (or Partial AID) sub-field may be set to AID (or Partial AID) of the STA having received the NDP ACK frame. In addition, the AP may transmit the PS-Poll Group ACK (PPGA) frame to all the STAs.

FIG. 36 exemplarily illustrates a PPGA frame according to one embodiment of the present invention.

Referring to FIGS. 34 and 36, the PPGA frame may include a Frame Control field, an AID field (or an RA (receiver address) field), a BSSID field, a Bitmap size, an ACK bitmap, and a Padding field, as shown in FIG. 36(a). If the PPGA frame includes the RA field, the RA field may have the size of 6 octets. Herein, these fields are an example of fields that may be included in the PPGA frame. They may be replaced by other fields or an additional field may be further included.

The Type sub-field and the subtype sub-field in the Frame Control field indicate that the corresponding frame is the group ACK. The AID field indicates an STA that receives the corresponding PPGA frame. To allow all the STAs having performed PS-Poll to receive the PPGA frame, the AID field (or RA field) may be set to the broadcast address (e.g., all bits set to 1 or 0). The Bitmap size field indicates the size of the ACK bitmap field, and is set to the number (i.e., the total number of STAs having performed PS-Poll) set to 1 in the TIM. That is, only the STAs having correctly read the TIM and performed the PS-Poll operation may read the ACK bitmap field. The ACK bitmap field is set to 1 for the STA from which the AP has received the PS-Poll frame, and set to 0 for the STA from which the AP has not received the PS-Poll frame. Herein, the ACK bitmap field may be constructed in the same order as the bitmap of the TIM element.

In addition, as shown in FIG. 36(b), the PPGA frame may not include the Bitmap size field of FIG. 36(a), but may include the ACK bitmap. In this case, the STAs having performed PS-Poll may calculate the size of the ACK bitmap in the PPGA frame through TIM information. For example, the size of the ACK bitmap in the PPGA frame may be equal to the size of the bitmap in the TIM element.

In addition, the PPGA frame may include a Compressed MAC header (or New MAC header) as shown in FIG. 36(c), but may not include AID (or RA field) shown in FIG. 36(b). In this case, the STAs having performed PS-Poll after receiving the TIM may recognize that the corresponding frame is the group ACK, through the Type sub-field and the subtype sub-field in the Frame Control field.

The AP may transmit the (NDP) ACK frame or PPGA frame without transmitting STF in response to the last PS-Poll, which will be described with reference to FIG. 37.

Figure 37:
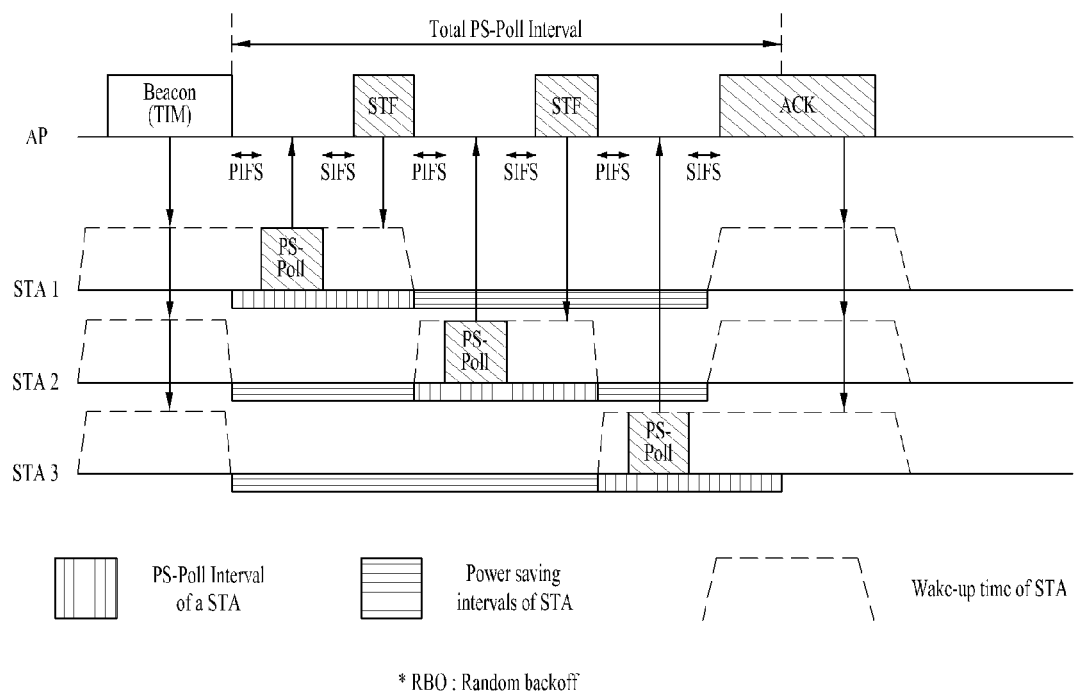
FIGS. 37 to 40 exemplarily illustrate the channel access operation of an STA according to one embodiment of the present invention.

FIG. 37 exemplarily illustrates the channel access operation of an STA according to one embodiment of the present invention.

In the example of FIG. 37, each of the STAs transmits the PS-Poll frame to the AP in the PS-Poll interval thereof, as in the example of FIG. 29, and the AP transmits STF in place of (NDP) ACK frame, in response to the PS-Poll frame.

Referring to FIG. 37, the AP receives the PS-Poll frame from STA 3, which is the last STA, and then transmits the (NDP) ACK frame or PPGA frame in place of STF after the SIFS. In this case, the STAs (except the last STA) having performed PS-Poll switch to the awake state at the time (the total PS-Poll interval–STF–SIFS) and perform CCA to receive ACK from the AP. The last STA (STA 3) begins to maintain the awake state from the PS-Poll interval thereof and performs CCA.

All the STAs indicated in the TIM may fail to receive the TIM and thus fail to transmit the PS-Poll frames in the PS-Poll intervals thereof, as described above, or in some cases, the STA has normally transmitted the PS-Poll frames, but the AP may fail to receive the PS-Poll frame. In this case, the AP, which has been described as transmitting the unsolicited NDP frame in the previous example, may transmit an unsolicited STF, which will be described with reference to FIG. 38.

Figure 38:
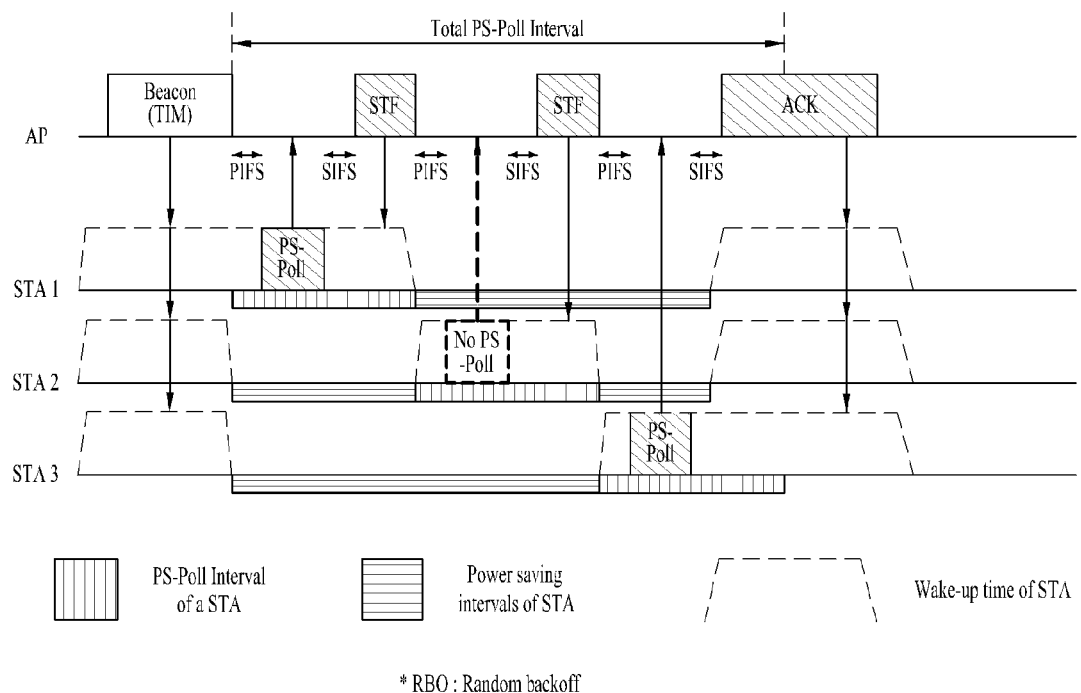

FIG. 38 exemplarily illustrates the channel access operation of an STA according to one embodiment of the present invention.

In the example of FIG. 38, each of the STAs transmits the PS-Poll frame to the AP in the PS-Poll interval thereof, as in the example of FIG. 29, and the AP transmits STF in place of (NDP) ACK frame, in response to the PS-Poll frame.

Referring to FIG. 38, the AP fails to receive PS-Poll frame from STA 2. If the AP fails to receive PS-Poll from an STA at the PS-Poll transmission time in a determined PS-Poll interval of the STA, the AP transmits an unsolicited STF to the STA after the SIFS. When it is assumed that the STA has normally transmitted the PS-Poll, the time at which the unsolicited STF is transmitted may be identical to the time (PIFS+PS-Poll transmission time+SIFS) at which the STF is transmitted. By transmitting the unsolicited STF if the AP does not receive the PS-Poll frame at an assigned time from the assigned STA, intervention of the other STA (e.g., a hidden node) in the PS-Poll interval may be prevented.

The unsolicited NDP frame or STF may also be used in other situations than the aforementioned case by the AP in order to prevent channel access by the other STAs, which will be described with reference to FIG. 39.

Figure 39:
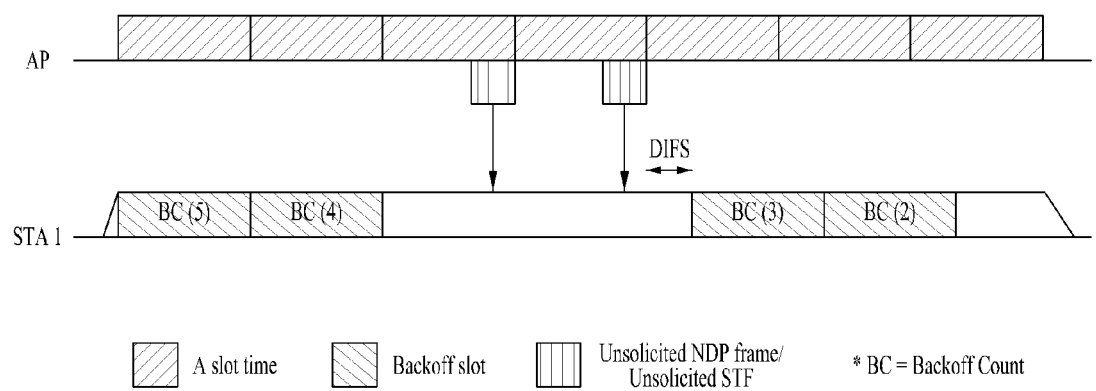

FIG. 39 exemplarily illustrates the channel access operation of an STA according to one embodiment of the present invention.

Referring to FIG. 39, once the random backoff process for channel access begins, STA 1 continues to monitor the medium while counting down the backoff slot according to the determined backoff count value. The AP transmits the unsolicited NDP frame/STF in a specific slot to prevent channel access by the other STAs, and the STA stops countdown and waits in the slot in which the unsolicited NDP frame/STF is transmitted from the AP, since the busy status of the medium is monitored. If the medium is switched to the idle status in the DIFS, the STA resumes the remaining countdown. In this way, the AP may prevent channel access by undetermined STAs in a specific slot by transmitting the unsolicited NDP frame/STF.

In the meantime, only the total PS-Poll interval may be set without setting PS-Poll intervals for the respective STAs indicated by the TIM element, and the PS-Poll operation may be performed based on contention, which will be described with reference to FIG. 40.

Figure 40:
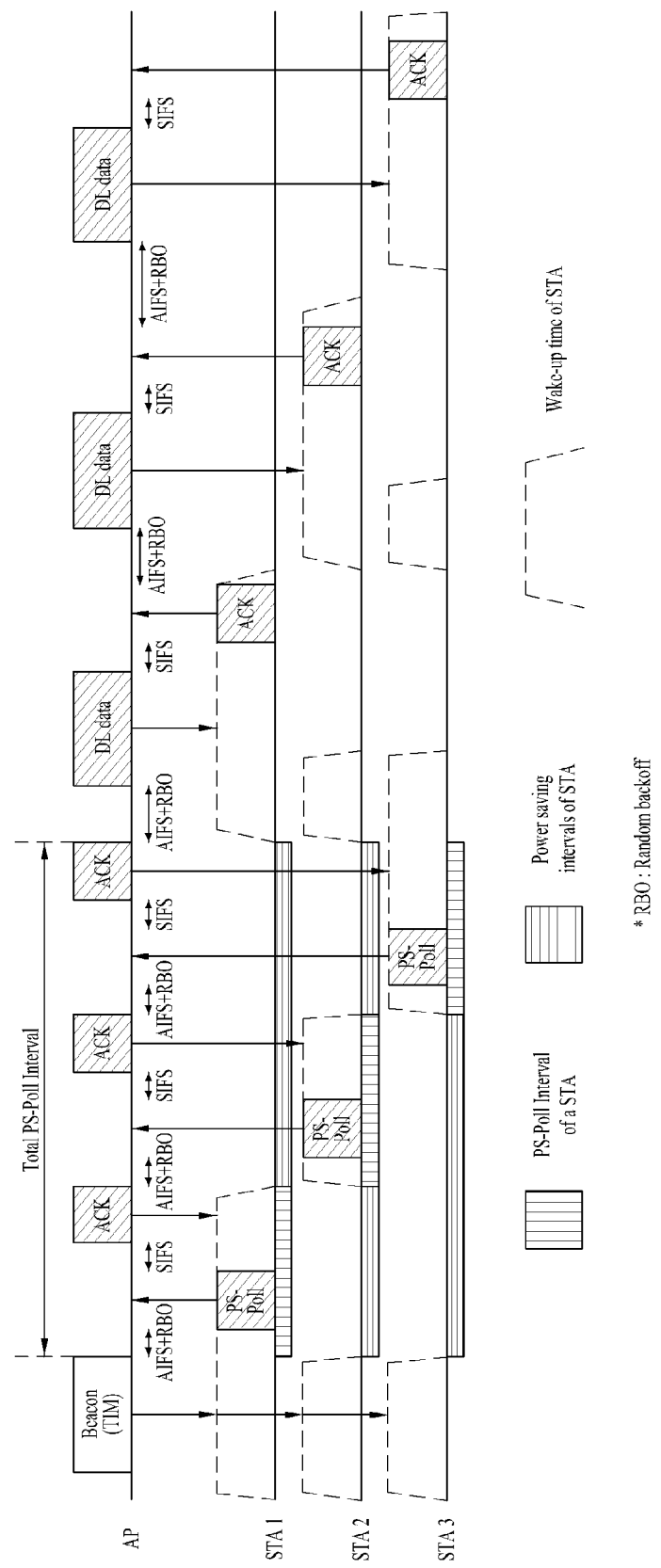

FIG. 40 exemplarily illustrates the channel access operation of an STA according to one embodiment of the present invention.

Referring to FIG. 40, only the STAs (STA 1, STA 2, STA 3) having confirmed, through the TIM element that the AP stores data directed to the STAs may perform PS-Poll based on contention within the total PS-Poll interval. At this time, the AP may inform the STAs of information about the length and position of the total PS-Poll interval, through TIM information. Otherwise, the STA may confirm the length and position of the total PS-Poll interval through the Duration field of the beacon.

In the case illustrated in FIG. 40, STA 1 selects the smallest backoff count value, STA 2 selects the second smallest backoff count value, and STA 3 selects the greatest backoff count value. When STA 1 having received the beacon confirms that the medium is in the idle status in the AIFS, STA 1 counts down the backoff slot, and then transmits the PS-Poll frame to the AP. Upon receiving the PS-Poll frame, the AP transmits the ACK frame to STA 1 after the SIFS. Thereafter, STA 2 and STA 3 transmit the PS-Poll frame to the AP in the same manner.

Figure 41:
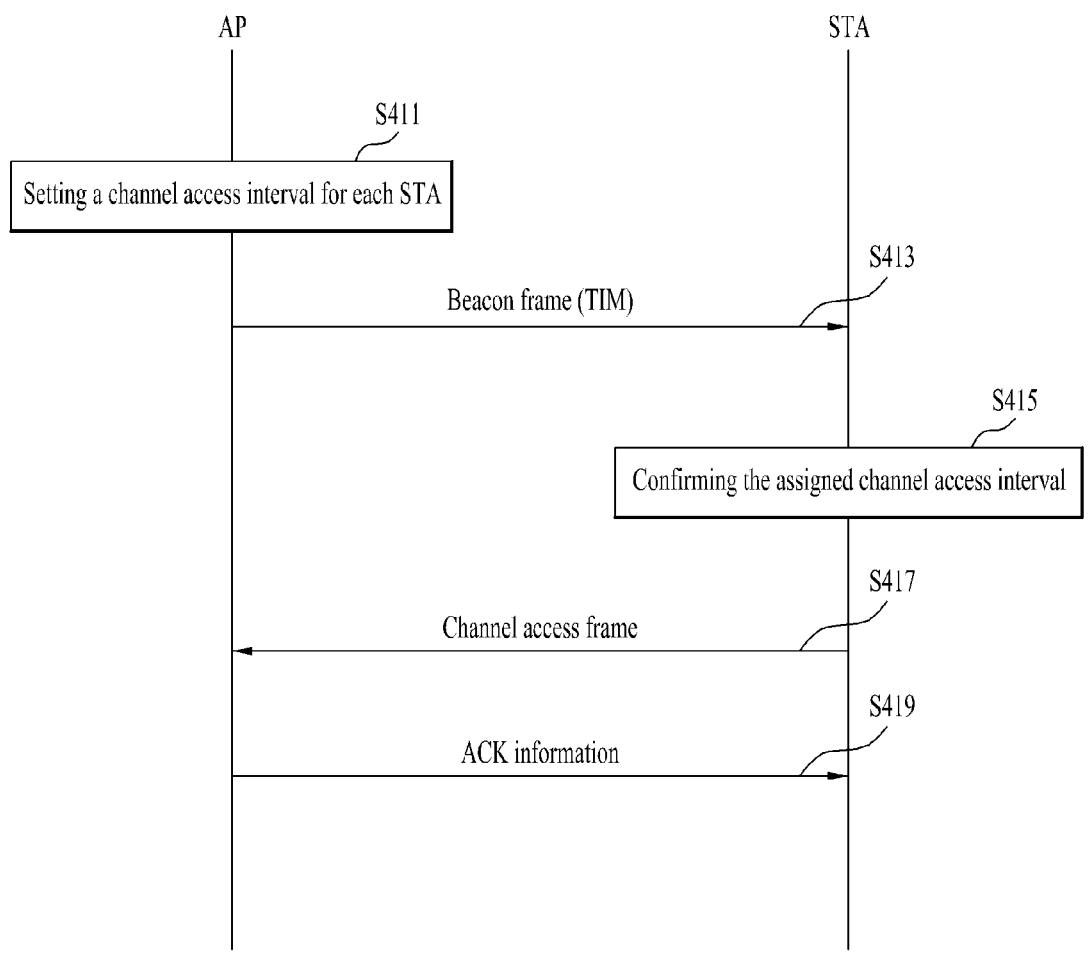
FIG. 41 exemplarily illustrates a channel access method according to one embodiment of the present invention.

FIG. 41 exemplarily illustrates a channel access method according to one embodiment of the present invention.

Referring to FIG. 41, the AP sets channel access intervals (e.g., PS-Poll intervals) of STAs for which downlink data is specified (S411).

The AP transmits, to the STAs, a TIM element including information indicating presence or absence of downlink data to be transmitted to the respective STAs according to the beacon period, through a beacon frame (S413). Herein, the TIM element may additionally include information about the positions of channel access intervals of the STAs for which downlink data is specified by the TIM element, information about the start time of the total channel access interval, length information about the channel access intervals, and sequence information about the channel access intervals.

The STA receives the beacon frame from the AP by switching to the awake state in accordance with the beacon transmission period, and then the STA confirms, through the TIM element in the received beacon frame, presence or absence of downlink data assigned thereto and a channel access interval assigned (allocated) thereto (S415).

Subsequently, the STA transmits a channel access frame (e.g., a PS-Poll frame) to the AP in the channel access interval assigned thereto (S417). The STA maintains the awake state only in the channel access interval assigned thereto within the total channel access interval to transmit the channel access frame to the AP. Herein, the channel access frame may employ the format of an NDP PS-Poll frame.

The AP transmits an ACK frame to the STA in response to the received channel access frame (S419). The ACK frame may be transmitted to each of the STAs within the PS-Poll interval of each of STAs, or may be transmitted to all the STAs after the channel access interval. Herein, the format of the NDP ACK frame or the group ACK frame (e.g., PPGA frame) may be use for the ACK frame. Thereafter, the AP transmits the stored data to each STAs.

The details given above may be independently applied to the various embodiments of the present invention, or simultaneously applied to two or more embodiments.

Figure 42:
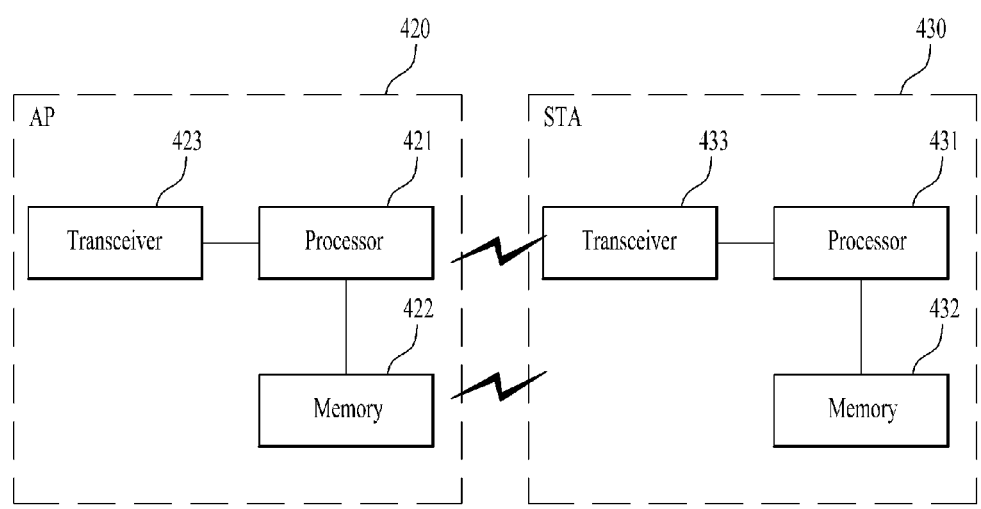
FIG. 42 is a block diagram illustrating a radio frequency device according to one embodiment of the present invention.

FIG. 42 is a block diagram illustrating a radio frequency device according to one embodiment of the present invention.

Referring to FIG. 42, the AP 420 includes a processor 421, a memory 422, and a tranceiver 423. The processor 421 implements the proposed functions, processes and/or methods. The wireless interface protocol layers (see FIG. 5) may be implemented by the processor 421. The memory 422 is connected to the processor 421, and stores various kinds of information for driving the processor 421. The tranceiver 423 is connected to the processor 421 to transmit and/or receive a radio frequency signal.

The STA 430 includes a processor 431, a memory 432, and a tranceiver 433. The processor 431 implements the proposed functions, processes and/or methods. The wireless interface protocol layers (see FIG. 5) may be implemented by the processor 431. The memory 432 is connected to the processor 431, and stores various kinds of information for driving the processor 431. The tranceiver 433 is connected to the processor 431 to transmit and/or receive a radio frequency signal.

The memory (422, 432) may be arranged inside or outside the processor (421, 431), and may be connected to the processor (421, 431) by a well known means. In addition, the AP 420 and/or STA 430 may have one single antenna or multiple antennas.

In the embodiments describe above, elements and features of the present invention are combined in a predetermined form. The elements or features should be considered as being selective, if not explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in anther embodiment, or may be replaced with elements or features from another embodiment. It is apparent that some of claims for which the dependency relationship is not explicitly stated may be combined to configure an embodiment or may be incorporated into a new claim through amendments after filing of this application.

Embodiments of the present invention may be implemented by various means such as, for example, hardware, firmware, software, or combinations thereof. When implemented by hardware, one embodiment of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodied in firmware or software, one embodiment of the present invention may be implemented in the form of a module, a procedure, a function, or the like. which perform the functions and or operations described above. A software code may be stored in the memory and actuated by the processor. The memory is disposed inside or outside the processor and may tranceive data with the processor through various well known means.

It will be apparent to those skilled in the art that various modifications and variations can be made in the present invention without departing from the essential features of the present invention. Thus, the descriptions given should not be construed as being limited but considered as being illustrative. The scope of the present invention should be determined through reasonable interpretation of the appended claims. The present invention is intended to cover the modifications and variations of this invention provided they come within the scope of the appended claims and their equivalents.

INDUSTRIAL APPLICABILITY

Various embodiments of the present invention have been described through examples applied to IEEE 802.11 system, but they may also be equally applied to various wireless access system other than the IEEE 802.11 system.

The invention claimed is:

1. A channel access method for supporting channel access of a station (STA) in a wireless communication system, the method comprising:
   transmitting, by an access point (AP), a beacon frame comprising a traffic indication map (TIM),
   wherein the beacon frame further comprises information for determining a start time and an order of a PS-Poll interval, set differently for each STA among a plurality of STAs,
   wherein the plurality of STAs are assigned with downlink data as indicated by the TIM;
   receiving, by the AP, Power Save (PS)-Poll frames from the plurality of STAs,
   wherein a PS-Poll frame corresponding to each STA is transmitted within the PS-Poll interval set for each STA; and
   transmitting, by the AP, data frames in response to the PS-Poll frames after a total PS-Poll interval,
   wherein the total PS-Poll interval comprises PS-Poll intervals set for the plurality of STAs.

2. The channel access method according to claim 1, further comprising the step of transmitting an acknowledgement (ACK) frame to each STA within the PS-Poll interval set for each STA in response to the PS-Poll frame corresponding to each STA.

3. The channel access method according to claim 1, further comprising the steps of:
   transmitting a short training field (STF) to each STA within the PS-Poll interval set for each STA in response to the PS-Poll frame corresponding to each STA; and
   transmitting, after the total PS-Poll interval, an acknowledgement (ACK) frame containing a bitmap indicating whether or not the PS-Poll frames from the plurality of STAs have been received.

4. The channel access method according to claim 1, further comprising the step of transmitting, when the PS-Poll frame corresponding to each STA is not received from each STA within the PS-Poll interval set for each STA, an unsolicited acknowledgement (ACK) frame or a short training field (STF) to each STA within the PS-Poll interval set for each STA.

5. The channel access method according to claim 1, further comprising the step of transmitting, when a delay sensitive data frame is transmitted to each STA, the delay sensitive data frame to each STA without a random backoff procedure after the total PS-Poll interval.

6. The channel access method according to claim 1, wherein the information comprises at least one of offset information of each PS-Poll interval and duration information of each PS-Poll interval.

7. A channel access method for a station (STA) to perform channel access in a wireless communication system, the method comprising:
   receiving, by the STA, a beacon frame comprising a traffic indication map (TIM) from an access point (AP),
   wherein the beacon frame further comprises information for determining a start time and an order of a PS-Poll interval, set differently for each STA among a plurality of STAs,
   wherein the plurality of STAs are assigned with downlink data as indicated by the TIM;
   transmitting, by the STA, when downlink data is assigned to the STA as indicated by the TIM, a Power Save (PS)-Poll frame within a PS-Poll interval set for the STA; and
   receiving a data frame from the AP in response to the PS-Poll frame after a total PS-Poll interval,
   wherein the total PS-Poll interval comprises PS-Poll intervals set for the plurality of STAs.

8. The channel access method according to claim 7, further comprising the step of maintaining a sleep state in an interval within the total PS-Poll interval other than the PS-Poll interval set for the STA.

9. The channel access method according to claim 7, further comprising the step of receiving an acknowledgement (ACK) frame within the PS-Poll interval set for the STA in response to the PS-Poll frame.

10. The channel access method according to claim 7, further comprising the step of receiving, when the STA is assigned with a last PS-Poll interval within the total PS-Poll interval a data frame from the AP, in response to the PS-Poll frame.

11. The channel access method according to claim 7, further comprising the steps of:
    receiving a short training field (STF) within the PS-Poll interval set for the STA, in response to the PS-Poll frame; and
    receiving, after the total PS-Poll interval, an acknowledgement (ACK) frame containing a bitmap indicating whether or not the PS-Poll frames from every STA have been received.

12. The channel access method according to claim 7, further comprising the step of receiving, when the STA is assigned with a last PS-Poll interval within the total PS-Poll interval, an acknowledgement (ACK) frame from the AP in response to the PS-Poll frame.

13. The channel access method according to claim 7, wherein the information comprises at least one of offset information of each PS-Poll interval and duration information of each PS-Poll interval.

14. An Access Point (AP) for supporting channel access of a station (STA) in a wireless communication system, the AP comprising:
    a transceiver that transmits and receives a radio frequency signal; and
    a processor that controls the transceiver to:
    transmit a beacon frame comprising a traffic indication map (TIM),
    wherein the beacon frame further comprises information for determining a start time and an order of a PS-Poll interval set differently for each STA among a plurality of STAs,
    wherein the plurality of STA are assigned with downlink data as indicated by the TIM;
    receive Power Save (PS)-Poll frames from the plurality STAs, wherein a PS-Poll frame corresponding to each STA is transmitted within the PS-Poll interval set for each STA; and transmit data frames in response to the PS-Poll frames after a total PS-Poll interval, wherein the total PS-Poll interval comprises PS-Poll intervals set for the plurality of STAs.

15. The AP according to claim 14, wherein the processor controls the transceiver to transmit an acknowledgement (ACK) frame to each STA within the PS-Poll interval set for each STA in response to the PS-Poll frame corresponding to each STA.

16. The AP according to claim 14, wherein the processor controls the transceiver to:

transmit a short training field (STF) to each STA within the PS-Poll interval set for each STA in response to the PS-Poll frame corresponding to each STA; and transmit, after the total PS-Poll interval, an acknowledgement (ACK) frame containing a bitmap indicating whether or not the PS-Poll frames from the plurality of STAs have been received.

17. The AP according to claim 14, wherein the processor controls the transceiver to transmit, when the PS-Poll frame corresponding to each STA is not received from each STA within the PS-Poll interval set for each STA, an unsolicited acknowledgement (ACK) frame or a short training field (STF) to each STA within the PS-Poll interval set for each STA.

18. The AP according to claim 14, wherein the processor controls the transceiver to transmit, when a delay sensitive data frame is transmitted to each STA, the delay sensitive data frame to each STA without a random backoff procedure after the total PS-Poll interval.

19. The AP according to claim 14, wherein the information comprises at least one of offset information of each PS-Poll interval and duration information of each PS-Poll interval.

20. A station (STA) apparatus configured to perform channel access in a wireless communication system, the STA comprising:

a transceiver that transmits and receives a radio frequency signal; and a processor that controls the transceiver to:

receive a beacon frame comprising a traffic indication map (TIM) from an access point (AP), wherein the beacon frame further comprises information for determining a start time and an order of a PS-Poll interval, set differently for each STA among a plurality of STAs, wherein the plurality of STA are assigned with downlink data as indicated by the TIM;

transmit, when downlink data is assigned to the STA as indicated by the TIM, a Power Save (PS)-Poll frame within a PS-Poll interval set for the STA and receive a data frame from the AP in response to the PS-Poll frame after a total PS-Poll interval, wherein the total PS-Poll interval comprises PS-Poll intervals set for the plurality of STAs.

21. The STA according to claim 20, wherein the processor maintains a sleep state in an interval within the total PS-Poll interval other than the PS-Poll interval set for the STA.

22. The STA according to claim 20, wherein the processor controls the transceiver to receive an acknowledgement (ACK) frame within the PS-Poll interval set for the STA in response to the PS-Poll frame.

23. The STA according to claim 20, wherein the processor controls the transceiver to receive, when the STA is assigned with a last PS-Poll interval within the total PS-Poll interval a data frame from the AP, in response to the PS-Poll frame.

24. The STA according to claim 20, wherein the processor controls the transceiver to:

receive a short training field (STF) within the PS-Poll interval set for the STA, in response to the PS-Poll frame; and receive, after the total PS-Poll interval, an acknowledgement (ACK) frame containing a bitmap indicating whether or not the PS-Poll frames from every STA have been received.

25. The STA according to claim 20, wherein the processor controls the transceiver to receive, when the STA is assigned with a last PS-Poll interval within the total PS-Poll interval, an acknowledgement (ACK) frame from the AP in response to the PS-Poll frame.

26. The STA according to claim 20, wherein the information comprises at least one of offset information of each PS-Poll interval and duration information of each PS-Poll interval.

* * * * *